United States Patent
Muraoka et al.

(10) Patent No.: US 9,313,750 B2
(45) Date of Patent: Apr. 12, 2016

(54) FREQUENCY MANAGEMENT APPARATUS AND FREQUENCY MANAGEMENT METHOD IN WIRELESS SYSTEM

(71) Applicant: NEC Corporation, Tokyo (JP)

(72) Inventors: Kazushi Muraoka, Tokyo (JP); Hiroto Sugahara, Tokyo (JP); Kojiro Hamabe, Tokyo (JP); Masayuki Ariyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/397,140

(22) PCT Filed: Apr. 23, 2013

(86) PCT No.: PCT/JP2013/002732
§ 371 (c)(1),
(2) Date: Oct. 24, 2014

(87) PCT Pub. No.: WO2013/161281
PCT Pub. Date: Oct. 31, 2013

(65) Prior Publication Data
US 2015/0119014 A1    Apr. 30, 2015

(30) Foreign Application Priority Data
Apr. 24, 2012 (JP) .................. 2012-098485

(51) Int. Cl.
*H04M 3/00* (2006.01)
*H04W 52/24* (2009.01)
(Continued)

(52) U.S. Cl.
CPC ............ *H04W 52/243* (2013.01); *H04W 16/14* (2013.01); *H04W 52/367* (2013.01); *H04W 52/50* (2013.01)

(58) Field of Classification Search
CPC . H04W 16/14; H04W 52/243; H04W 52/367; H04W 52/50
USPC .......................................... 455/418
See application file for complete search history.

(56) References Cited

U.S. PATENT DOCUMENTS

2004/0106407 A1* 6/2004 Kikuma ............... H04W 36/22
455/436
2011/0028179 A1  2/2011 Sawai et al.

FOREIGN PATENT DOCUMENTS

EP     1434364 A2 *  6/2004  ........... H04W 52/24
JP     2007-306167    11/2007
(Continued)

OTHER PUBLICATIONS

CEWiT, Cognitive Interference Management for Type I Relays, R1-093278, 3GPP, Aug. 28, 2009, 3. Cognitive Interference Management, 6 pages.
(Continued)

*Primary Examiner* — Timothy Pham
(74) *Attorney, Agent, or Firm* — Wilmer Cutler Pickering Hale and Dorr LLP

(57) ABSTRACT

A frequency management method and device as well as a wireless system are provided by which acceptable transmit power is efficiently determined for transmitting stations in a system on the interfering side, neither with concentration of processing load on some part nor with redundant processing. When a frequency management apparatus (50_1) receives a notice regarding a change in the state of frequency use from a radio station (20_1) under its own management (S101), the frequency management apparatus (50_1) sets acceptable transmit power for radio stations (20_1, 20_2) under its own management and radio stations (20_3, 20_4) managed by another frequency management apparatus (50_2), based on the notified change in the state of frequency (S103, S104).

28 Claims, 18 Drawing Sheets

(51) Int. Cl.
*H04W 16/14* (2009.01)
*H04W 52/36* (2009.01)
*H04W 52/50* (2009.01)

(56) References Cited

FOREIGN PATENT DOCUMENTS

| | | |
|---|---|---|
| JP | 2011-166721 | 8/2011 |
| JP | 2012-060455 | 3/2012 |
| JP | 2012-151815 | 8/2012 |
| WO | WO-2012-056828 | 5/2012 |

OTHER PUBLICATIONS

International Search Report corresponding to PCT/JP2013/002732, mail date Jul. 16, 2013, 2 pages.

* cited by examiner

FIRST EXEMPLARY EMBODIMENT

THIRD EXEMPLARY EMBODIMENT

SIXTH EXEMPLARY EMBODIMENT

SEVENTH EXEMPLARY EMBODIMENT

FREQUENCY MANAGEMENT APPARATUS AND FREQUENCY MANAGEMENT METHOD IN WIRELESS SYSTEM

CROSS-REFERENCE TO RELATED APPLICATIONS

This application is a national stage application of International Application No. PCT/JP2013/002732 entitled "FREQUENCY MANAGEMENT APPARATUS AND FREQUENCY MANAGEMENT METHOD IN WIRELESS SYSTEM" filed on Apr. 23, 2013, which claims priority to Japanese Patent Application No. 2012-098485 filed on Apr. 24, 2012, the disclosures of which are hereby incorporated by reference in their entirety.

TECHNICAL FIELD

The present invention relates to a wireless system and, more particularly, to a frequency management apparatus and a frequency management method for managing frequency use by radio stations.

BACKGROUND ART

Cognitive radio is known, which recognizes a radio environment in its vicinity and optimizes communication parameters depending on the radio environment. However, when a frequency band allocated to a wireless communication system is shared by another wireless communication system, it is necessary to consider an issue of interference. Hereinafter, a system on the side originally allocated a frequency band and suffering interference will be referred to as a primary system (interfered system), a system on the side secondarily using this frequency band and causing interference will be referred to as a secondary system (interfering system), a receiving station of the primary system will be referred to as a primary receiving station, and a transmitting station of the secondary system will be referred to as a secondary transmitting station.

When the secondary system shares a frequency band with the primary system, the secondary system needs to avoid affecting existing services provided by the primary system. To this end, the transmit power of secondary transmitting stations needs to be adjusted such as to be not greater than maximum transmit power, at which primary receiving stations can maintain predetermined reception quality. Hereinafter, this maximum transmit power will be referred to as acceptable transmit power, and actual transmit power adjusted to be not greater than the maximum transmit power will be referred to as actual transmit power. Here, conceivable criteria for maintaining the predetermined reception quality include: maintaining the CIR (Carrier to Interference Ratio) or CINR (Carrier to Interference plus Noise Ratio) of a primary receiving station at a predetermined value or higher; and keeping the amount of interference suffered by a primary receiving station at a predetermined value or lower.

For example, PTL 1 discloses a system for controlling the transmit power of secondary transmitting stations such as not to interfere on a primary receiving station. According to PTL 1, a value is calculated by dividing interference power acceptable to a primary receiving station (hereinafter, referred to as acceptable interference power) by the number of secondary transmitting stations, and acceptable transmit power is calculated such that interference from a secondary transmitting station will be not greater than that value. Thus, gross interference from the plurality of secondary transmitting stations is suppressed to the acceptable interference power or lower, whereby the primary receiving station can maintain predetermined reception quality even when the plurality of secondary transmitting stations perform transmission at the same time.

Hereinafter, an outline of a system architecture as assumed in PTL 1 will be described with reference to FIG. 1. Referring to FIG. 1, spectrum managers SM (coordinators in PTL 1) manage use of frequencies by secondary transmitting stations Ts. More particularly, the spectrum manager SM1 manages the secondary transmitting stations Ts11 and Ts12, and the spectrum manager SM2 manages the secondary transmitting stations Ts21 and Ts22. Moreover, the spectrum managers SM1 and SM2 share information related to the secondary transmitting stations Ts under their respective own management through a common database DB (a management node in PTL 1). According to PTL 1, disclosed are two processes for determining acceptable transmit power, namely, centralized-type, and autonomous distributed-type.

In the centralized-type, information on a plurality of secondary transmitting stations Ts is aggregated at a database DB, and the database DB calculates acceptable transmit power for all the secondary transmitting stations Ts (Ts11, Ts12, Ts21, and Ts22). The calculated acceptable transmit power is notified, through the spectrum managers SM, to each secondary transmitting station Ts under their respective own management.

In the autonomous distributed-type, the spectrum managers SM share information related to the secondary transmitting stations Ts (e.g., the total number of the secondary transmitting stations) under their respective own management through a database DB. Each spectrum manager (e.g., SM1) calculates acceptable transmit power for the secondary transmitting stations under its own management (e.g., Ts11 and Ts12), taking into consideration the interference that the secondary transmitting stations (e.g., Ts21 and Ts22) under management of the other spectrum manager (e.g., SM2) may cause to the primary receiving station.

CITATION LIST

Patent Literature

[PTL 1]
Japanese Patent Application Unexamined Publication No. 2011-166721

SUMMARY OF INVENTION

Technical Problem

However, the processes for determining acceptable transmit power of the centralized-type and autonomous distributed-type described in PTL 1 have the following problems, respectively.

First, in the case of the centralized-type, the database DB calculates acceptable transmit power for each secondary transmitting station. This calculation is required each time a secondary transmitting station Ts makes a change in the state of frequency use. For example, supposing that a new secondary transmitting station Ts begins to share a frequency, a request to use a frequency from the secondary transmitting station Ts is notified to the database DB via its spectrum manager SM. At this time, the database DB calculates acceptable transmit power for the new secondary transmitting station Ts and for other secondary transmitting stations Ts sharing the frequency such that the new secondary transmitting station Ts can newly start transmission at this frequency while the primary receiving station can maintain predetermined reception quality. Similarly, when a secondary transmitting station Ts stops using this frequency as well, it is preferable to recalculate acceptable transmit power and thereby adjust gross interference caused by those secondary transmitting stations Ts that are currently performing transmission. However, if the total number of secondary transmitting stations that can use this frequency increases, changes in the state of frequency use such as start and stop of frequency use frequently occur and at each of such times, the database DB calculates acceptable transmit power. Consequently, processing load is concentrated on the database DB.

On the other hand, in the case of the autonomous distributed-type, there is a possibility that the calculation of acceptable transmit power by each spectrum manager overlaps with the other's, resulting in redundant calculation processing. Assume that a plurality of primary receiving stations Rp (here, Rp1, Rp2, and Rp3) exist within the service area of a primary transmitting station Tp (primary system service area), as shown in FIG. 1. The acceptable transmit power of the secondary transmitting stations Ts needs to be determined by taking into consideration the interference from each secondary transmitting station Ts on each primary receiving station Rp, so that all of the primary receiving stations Rp can maintain predetermined reception quality. Assuming that P(n) is the acceptable transmit power of an n-th (1≤n≤N) secondary transmitting station (this acceptable transmit power is assumed to be equivalent isotropically radiated power with antenna gain factored in), interference $I_m$ suffered by an m-th primary receiving station (1≤m≤M) can be expressed by the following mathematical expression (1).

[Math. 1]

$$I_m = \sum_{n=1}^{N} \frac{P(n)}{L_{n,m}} \leq I_{max,m} \quad (1)$$

Here, $L_{n,m}$ is path loss from the n-th secondary transmitting station to the m-th primary receiving station and is calculated by using a propagation model such as Hata formula. In the above expression (1), for simplicity, the reception antenna gain of the m-th primary receiving station is 1, and the shadowing effect on an interference signal is also omitted. Additionally, $I_{max,m}$ is the acceptable interference power of the m-th primary receiving station, and the sum of interference, $I_m$, needs to be this value or lower, as the expression (1) shows. That is, in order for the sum of interference to be acceptable interference power for every primary receiving station, it is necessary to search for a combination of the acceptable transmit power of secondary transmitting stations, [P(1), P(2), . . . , P(N)], that satisfies the inequality of the expression (1) for every m (1≤m≤M).

An infinite number of combinations satisfying the expression (1) exist in general, but among them, it is preferable to find an acceptable transmit power combination based on a criterion such as a combination yielding the maximum communication capacity of the secondary system. In this case, acceptable transmit power cannot be individually calculated for each secondary transmitting station. That is, in the autonomous distributed-type, since the spectrum managers SM1 and SM2 individually determine acceptable transmit power for the secondary transmitting stations under their respective own management, both spectrum managers search for a combination of the acceptable transmit power of the secondary transmitting stations Ts11, Ts12, Ts21, and Ts 22. As a result, the spectrum managers SM1 and SM2 perform the same calculation redundantly.

The present invention is made to solve the above-described problems, and an object thereof is to provide a frequency management method and apparatus, as well as a wireless system, that enable the acceptable transmit power of transmitting stations in a system on the interfering side to be efficiently determined, neither with concentration of processing load on some part nor with redundant processing.

Solution to Problem

A frequency management apparatus according to the present invention is a frequency management apparatus for managing frequency use by radio stations in a wireless system that shares a frequency allocated to another wireless system, characterized by comprising: a frequency use reception means for receiving a notice regarding a change in state of frequency use from a radio station managed by this frequency management apparatus; and an acceptable transmit power setting means for setting acceptable transmit power for at least one radio station managed by another frequency management apparatus different from the frequency management apparatus, based on the notified change in state of frequency.

A frequency management method according to the present invention is a frequency management method for managing frequency use by radio stations in a wireless system that shares a frequency allocated to another wireless system, characterized by comprising: by a frequency use reception means, receiving a notice regarding a change in state of frequency use from a radio station managed by a relevant frequency management apparatus; and by an acceptable transmit power setting means, setting acceptable transmit power for at least one radio station managed by another frequency management apparatus different from the frequency management apparatus, based on the notified change in state of frequency.

A wireless communication system according to the present invention is a wireless system that shares a frequency allocated to another wireless system, characterized by comprising: a plurality of radio stations that share the frequency; and a plurality of frequency management apparatuses that manage frequency use by the plurality of radio stations, wherein a first frequency management apparatus, upon receiving a notice regarding a change in state of frequency use from a radio station under its own management, sets acceptable transmit power for at least one radio station managed by a second frequency management apparatus different from the first frequency management apparatus, based on the notified change in state of frequency.

Advantageous Effects of Invention

According to the present invention, it is possible to efficiently determine the acceptable transmit power of transmitting stations in a system on the interfering side, neither with concentration of processing load on some part nor with redundant processing.

DESCRIPTION OF EMBODIMENTS

Figure 1:
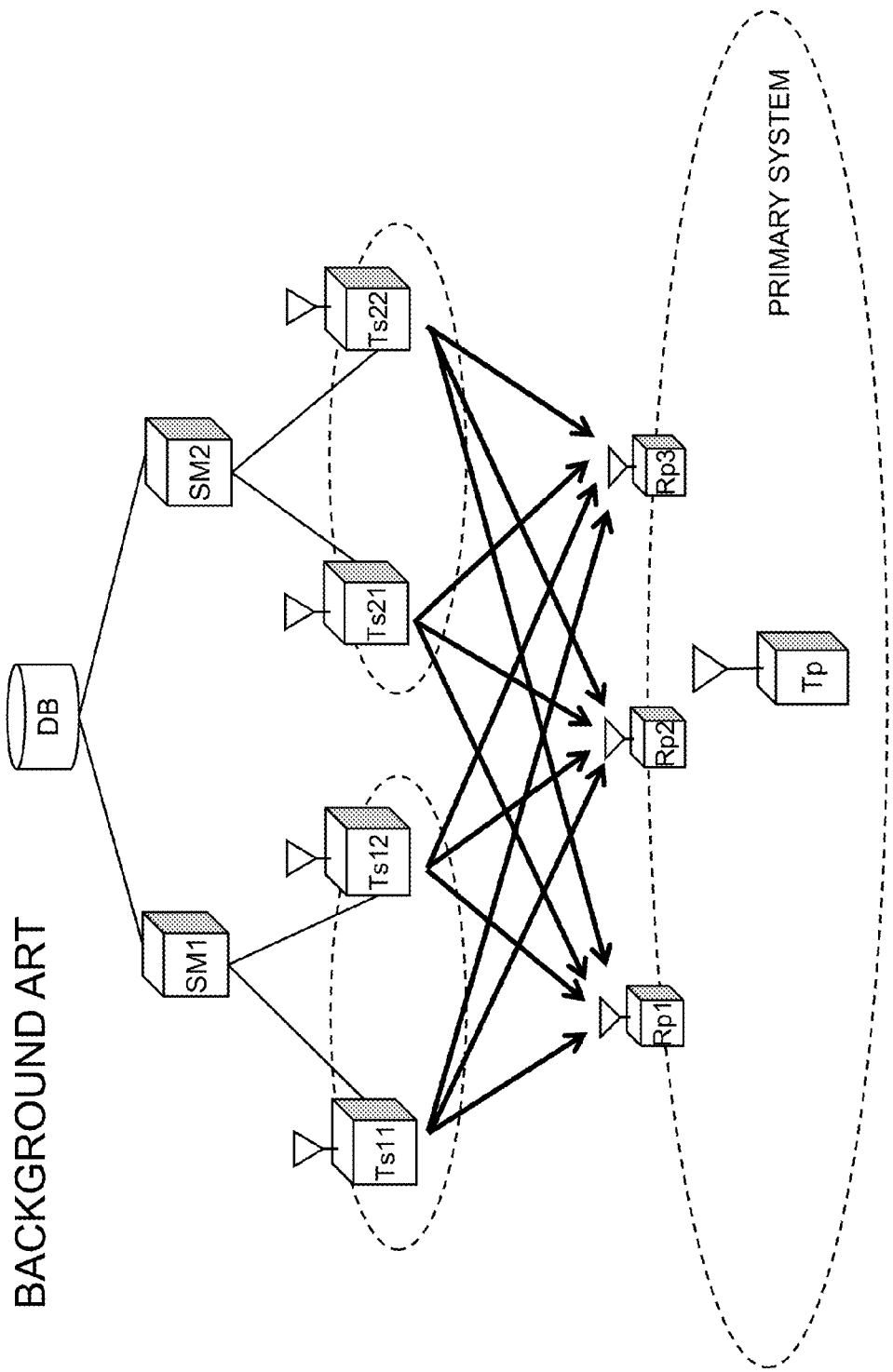
FIG. 1 is a schematic system architecture diagram for describing a background art.

According to exemplary embodiments of the present invention, when a frequency management apparatus in a wireless communication system (secondary system) that uses a frequency allocated to a primary system receives a notice regarding a change in the state of frequency use from a radio station under its own management, this frequency management apparatus calculates acceptable transmit power not only for radio stations under its own management but also for radio stations under management of another frequency management apparatus, and notifies results of the acceptable transmit power calculation not only to the radio stations under its own management but also to the radio stations under management of the other device. Thus, occasions to calculate acceptable transmit power are not concentrated on a particular frequency management apparatus, and no redundant calculation processing occurs among frequency management apparatuses.

Accordingly, when the acceptable transmit power of radio stations is calculated, it is possible to preclude redundant calculation processing while avoiding concentration of processing load.

In the following description, a system is assumed, as an example, in which a primary system is, for example, a TV broadcast system and a secondary system is, for example, a cellular system. A secondary transmitting station can be, for example, a base station, a relay station, or a terminal station in the cellular system. Such a frequency sharing configuration wherein the primary system is TV broadcast is referred to as TV white space use. Needless to say, this configuration is a mere example, and the combination of the primary and secondary systems is not limited to such a configuration. The combination of the primary and secondary systems may be, for example, a combination of a TV system and a WRAN (Wireless Regional Access Network) system, or a combination of a TV system and a local radio or anti-disaster radio of a municipality or the like. For other examples, the primary system may be a wireless microphone or an application-specific radio (e.g., a radio for collective housing, a self-operated radio within an enterprise, a radio for agriculture, or the like), or the secondary system may be a wireless LAN (Local Area Network). Moreover, the present invention is not necessarily limited to a combination of wireless systems that have different priorities when a frequency is used, such as primary and secondary systems, but a configuration may assume that a frequency is shared by wireless systems with same-level priorities. Further, in the present invention, a plurality of wireless systems may exist as secondary systems. A plurality of secondary transmitting stations used in the following description do not need to belong to the same wireless system, but may be transmitting stations belonging to different secondary systems. Hereinafter, exemplary embodiments of the present invention will be described in detail with reference to drawings.

1. First Exemplary Embodiment 1.1) System Architecture

According to a first exemplary embodiment of the present invention, a spectrum manager as a frequency management apparatus in the secondary system can notify the calculated values of transmit power not only to secondary transmitting stations under management of this spectrum manager but also to secondary transmitting stations managed by another spectrum manager. Hereinafter, for the simplicity of description, a description will be given of a case, as an example, where two spectrum managers each have two secondary transmitting stations under their respective own management.

Figure 2:
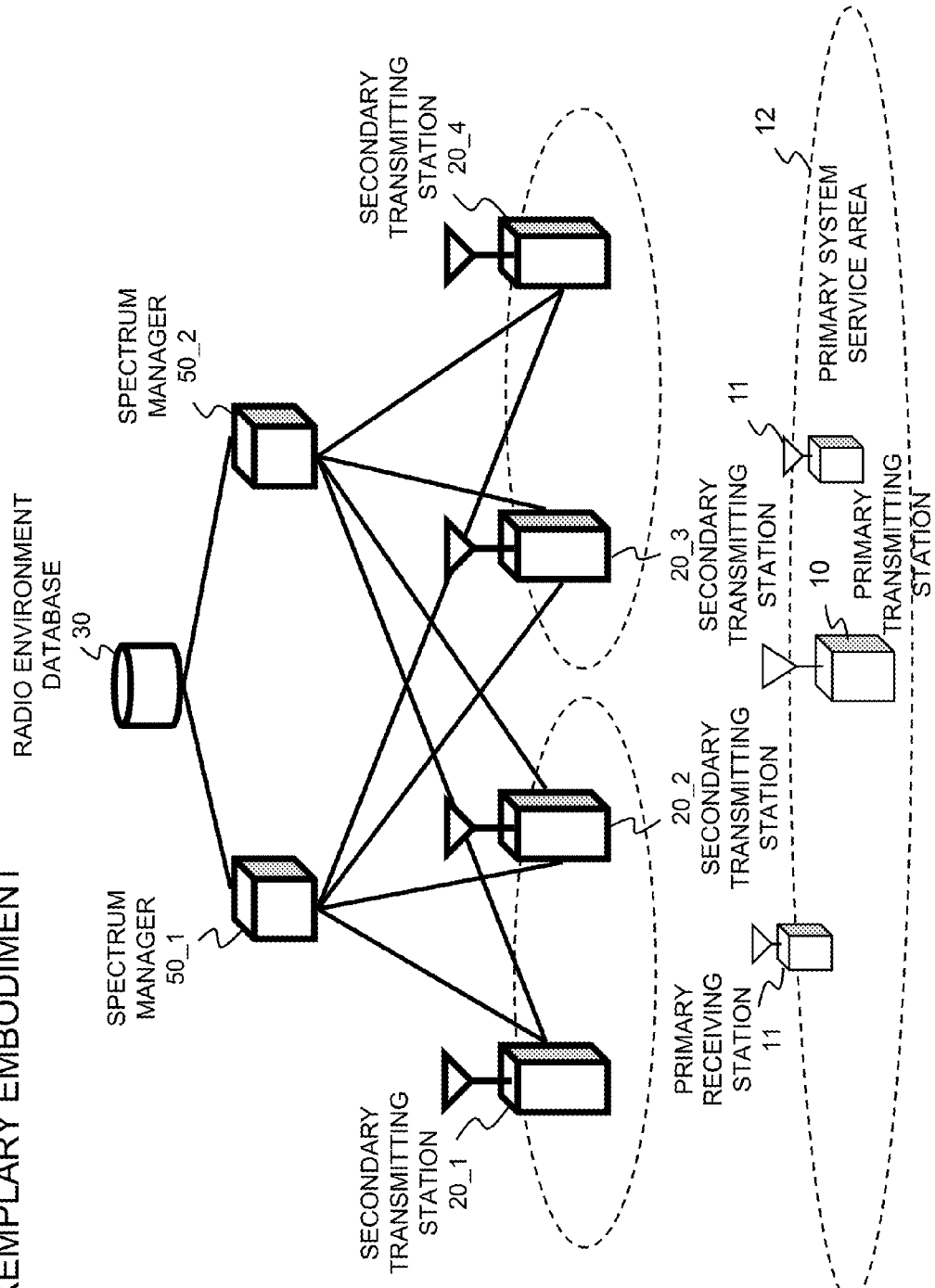
FIG. 2 is a system architecture diagram for describing a wireless communication system according to a first exemplary embodiment of the present invention.

Referring to FIG. 2, it is assumed that a wireless system according to the first exemplary embodiment of the present invention includes secondary transmitting stations 20 (20-1 to 20-4), spectrum managers 50 (50-1 and 50-2), and a radio environment database 30, and that each spectrum manager is communicably connected even to the secondary transmitting stations managed by the other spectrum manager.

The secondary transmitting stations 20 share a frequency of the primary system to communicate with secondary receiving stations (not shown). In a case where the primary system is TV broadcast, multiple frequencies (TV channels) are candidates to be shared. When a secondary transmitting station 20, before starting to share a frequency, notifies a request for start to the spectrum manager 50 that manages this secondary transmitting station, this spectrum manager 50 notifies secondary transmitting stations of available frequencies and acceptable transmit power at these frequencies as information, which will be described later. Note that a request for start from a secondary transmitting station 20 can include other information regarding the secondary transmitting station 20 (device ID, location, antenna height, and antenna directivity). Such information on the secondary transmitting station 20 is registered with this spectrum manager 50 and the radio environment database 30.

1.2) Available Frequency and Actually Used Frequency

An available frequency is defined as a frequency that a spectrum manager 50 permits a secondary transmitting station 20 to use. For example, when a secondary transmitting station 20 is out of, or a predetermined distance apart from the edge of, a primary system service area 12 of a certain frequency, this frequency is an available frequency to the secondary transmitting station 20. At an available frequency, a secondary transmitting station 20 is permitted to perform transmission as long as actual transmit power is not greater than acceptable transmit power determined by a spectrum manager. Moreover, it is also possible to define an available frequency as a frequency that satisfies another condition determined by a spectrum manager 50, in addition to the condition that a secondary transmitting station 20 is out of the primary system service area 12 and uses a frequency of the primary system service area 12.

On the other hand, an actually used frequency, which will be described later, is defined as a frequency that a secondary transmitting station actually uses for transmission. That is, a secondary transmitting station actually uses, as an actually used frequency, one frequency (or a plurality of frequencies) of available frequencies notified from a spectrum manager. After receiving notification about available frequencies and acceptable transmit power at them, a secondary transmitting station 20 determines an actually used frequency and actual transmit power and then starts communication. Further, when a secondary transmitting station 20 stops using a frequency, the secondary transmitting station 20 may make notification to that effect to its spectrum manager 50.

1.3) Notification of Actually Used Frequency and Actual Transmit Power

An actually used frequency and actual transmit power determined by a secondary transmitting station 20 are notified to its spectrum manager 50 in some cases, and are not notified in some cases. In a case where an actually used frequency and actual transmit power are not notified, the spectrum managers 50 only manage available frequencies and acceptable transmit power without knowing the actually used frequencies and actual transmit power of the secondary transmitting stations 20. Accordingly, the secondary transmitting stations 20 can freely change actually used frequencies and actual transmit power within available or acceptable ranges and can flexibly change the use of a frequency. However, since the spectrum managers 50 have no information about actually used frequencies and actual transmit power, it is difficult to grasp the state of interference, resulting in conservative frequency sharing in which acceptable transmit power is restricted to relatively lower levels. Hereinafter, in the present exemplary embodiment, a description will be given of a case where an actually used frequency and actual transmit power are not notified. A case where they are notified will be described later as a second exemplary embodiment.

1.4) Radio Environment Database

Information stored in the radio environment database 30 is as follows, for example.

Predetermined information related to the primary system (e.g., information about the location, service area, transmit power, antenna height, and antenna directivity of a primary transmitting station 10, information about the location, antenna height, antenna directivity, and the like of a primary receiving station 11, and the like). Here, in a case where the primary system is a TV broadcast system, it is difficult to know all TV receiving stations as there are an almost unlimited number of them. Accordingly, typical values are used for the antenna height and antenna directivity. As for the locations of TV receiving stations, it is assumed that TV receiving stations exist in a grid pattern (e.g., a grid of 100 m intervals) on a map. The spectrum managers according to the present exemplary embodiment control the transmit power of the secondary transmitting stations so that the reception quality of such an assumed TV receiving station will be maintained at a predetermined level. Hereinafter, it is assumed that a primary receiving station 11 represents such an assumed TV receiving station, and that the spectrum managers 50 calculate acceptable transmit power with respect to such an assumed TV receiving station.

Predetermined information related to the secondary system (e.g., information about the device ID, location, antenna height, antenna directivity, and the like of a secondary transmitting station 20, and the like). These pieces of information are registered via a spectrum manager 50 when a secondary transmitting station 20 accesses the spectrum manager 50 (when issuing a request for start frequency use, or the like).

Information on path loss between different radio stations. For example, path loss between a secondary transmitting station 20 and a primary receiving station 11 and path loss between a primary transmitting station 10 and a primary receiving station 11 are estimated beforehand by using a predetermined propagation model with the distance between radio stations and antenna heights as parameters, and are stored.

However, it is also possible that some of these pieces of information may be stored in an integrated form. The radio environment database 30 provides such stored information to a requester (e.g., a spectrum manager 50) as required. Note that the radio environment database 30 may be a device in which part or all of the functions of the spectrum managers 50 are integrated, or reversely, part or all of the functions of the radio environment database 30 may be integrated into the spectrum managers 50.

1.5) Spectrum Manager

The spectrum managers 50 have a function of calculating acceptable transmit power at each frequency for the secondary transmitting stations 20 and notifying available frequencies and acceptable transmit power at them. For example, acceptable transmit power is notified to the secondary transmitting stations in such a manner that acceptable transmit power at an unavailable frequency is set for 0 [W] and acceptable transmit power at an available frequency is set for greater than 0 [W], whereby it is possible to notify available frequencies by means of acceptable transmit power.

A spectrum manger 50 according to the present exemplary embodiment receives a notice regarding a change in the state of frequency use from a secondary transmitting station under its own management and calculates acceptable transmit power for the secondary transmitting stations managed by this spectrum manager and for the secondary transmitting stations managed by the other spectrum manager. Hereinafter, it is assumed that a "notice regarding a change in the state of frequency use" indicates a request for start of frequency use, a notice of stop of frequency use, a request to change transmit power, a request to change frequencies, or a radio environment measurement report. Note that a spectrum manager 50 is referred to as "Geo-location Database" or "White Space Database" in some cases, as other names for the form integrated with the radio environment database 30 or part thereof. Moreover, the radio environment database 30 or part thereof is referred to as "Geo-location Database" or "White Space Database" in some cases.

Figure 3:
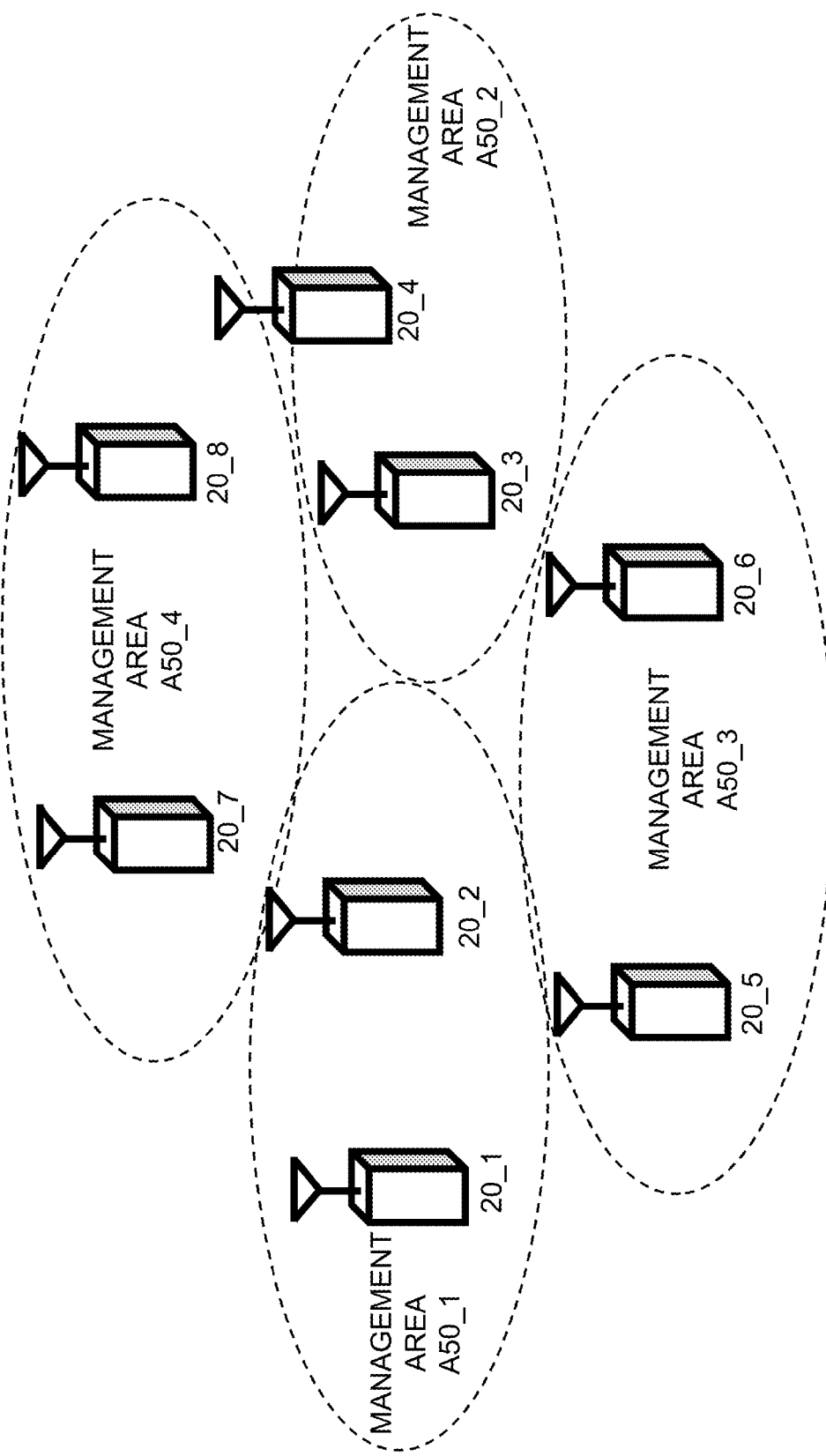
FIG. 3 is a diagram showing an example of a structure of management areas in a wireless system according to the first exemplary embodiment.

Referring to FIG. 3, the spectrum managers 50 can manage the secondary transmitting stations 20 on a geographical area basis. Here, the secondary transmitting stations 20_1 and 20_2 are included in the management area A50_1 of the spectrum manager 50_1 and are objects of management by the spectrum manager 50_1. Similarly, each of other spectrum managers (50_2, 50_3, and 50_4) also has a management area (A50_2, A50_3, and A50_4) and secondary transmitting stations (20_3 & 20_4, 20_5 & 20_6, and 20_7 & 20_8) included in the area, which are objects of management. More specifically, each management area A50 corresponds to a prefecture unit or nation unit.

For another method for management, it is also possible to determine a managing spectrum manager uniquely for a secondary transmitting station. For example, a managing spectrum manager is fixed based on the manufacture vender of a secondary transmitting station in some cases, based on a provider that provides a radio service to a secondary station in some cases, or based on the wireless system (LTE, WiMAX, or the like) of a secondary transmitting station in some cases. Further, there is also a case as another example where the spectrum managers manage on a basis of a frequency that a secondary transmitting station is using, which will be described in another exemplary embodiment.

Figure 4:
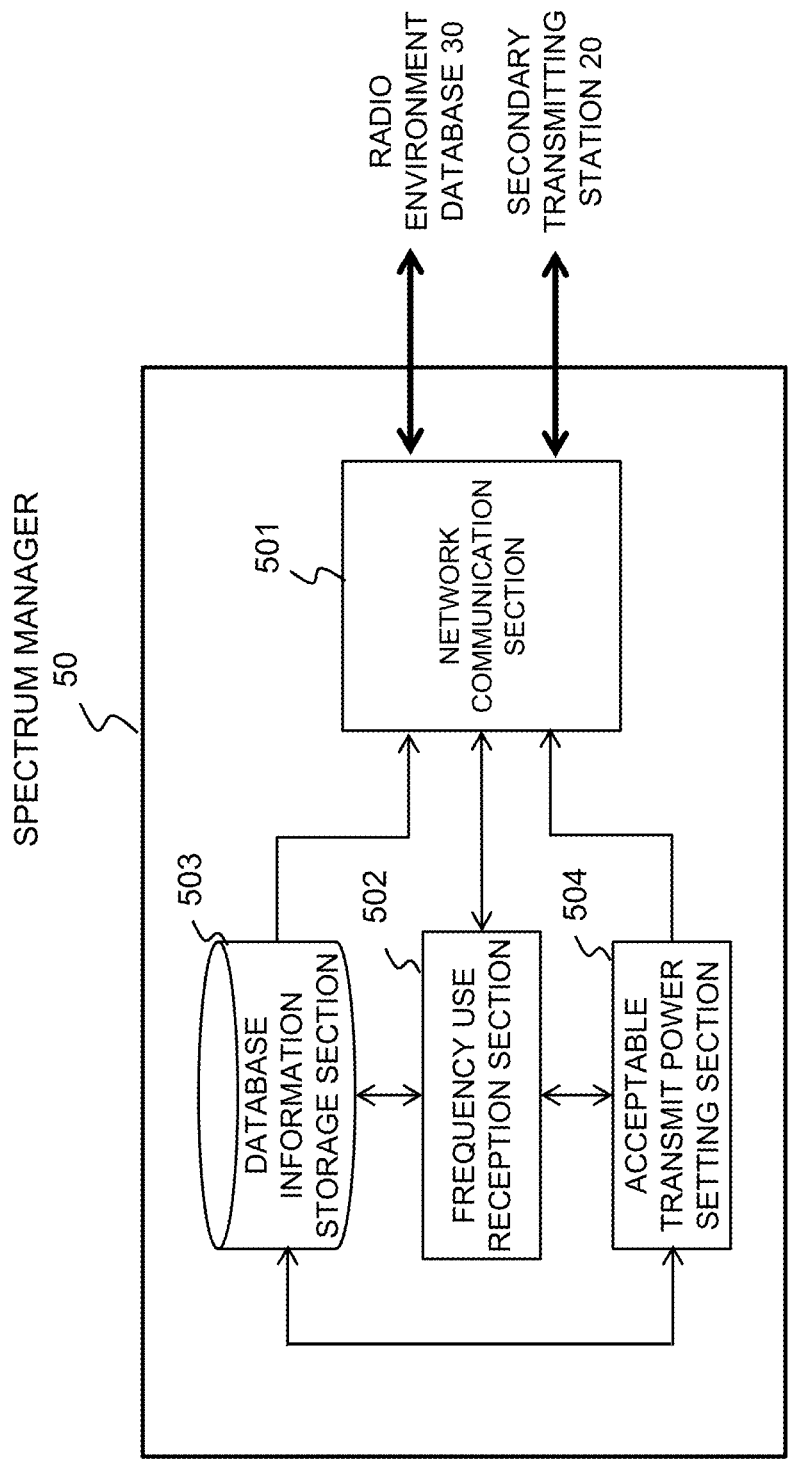
FIG. 4 is a block diagram showing a schematic configuration of a frequency management apparatus (spectrum manager) according to the first exemplary embodiment.

Referring to FIG. 4, the spectrum manager 50 includes a network communication section 501, a frequency use reception section 502, a database information storage section 503, and an acceptable transmit power setting section 504. The network communication section 501 has a function of allowing each section of the spectrum manager 50 to communicate with the secondary transmitting stations 20 and the radio environment database 30.

The frequency use reception section 502 receives a notice regarding a change in the state of frequency use from a secondary transmitting station 20 under management of this spectrum manager 50. For example, the frequency use reception section 502, when receiving a request for start of frequency use, registers information about the secondary transmitting station 20 included in the request information (device ID, location, antenna height, antenna directivity, and the like) with the database information storage section 503 and the radio environment database 30. Subsequently, the frequency use reception section 502 instructs the acceptable transmit power setting section 504 to calculate acceptable transmit power. When receiving another notice (e.g., a notice of stop of frequency use, or the like) as well, the frequency use reception section 502 similarly instructs the acceptable transmit power setting section 504 to calculate acceptable transmit power.

The database information storage section 503 stores information obtained from the radio environment database 30 and information obtained from the secondary transmitting stations 20. If each secondary transmitting station that is using a frequency does not notify its actually used frequency to the spectrum manager 50, the spectrum manager 50 cannot grasp which frequency is being used by each of the secondary transmitting stations 20, but available frequencies to each secondary transmitting station 20 are stored in the database information storage section 503.

The acceptable transmit power setting section 504, when receiving an instruction to calculate acceptable transmit power from the frequency use reception section 502, obtains information required to calculate acceptable transmit power from the database information storage section 503 as appropriate and performs the calculation. The information required for calculation includes part or all of information about the location, service area, transmit power, antenna height, and antenna directivity of a primary transmitting station 10, the location, antenna height, antenna directivity, and acceptable interference power of a primary receiving station 11, the device ID, location, antenna height, and antenna directivity of a secondary transmitting station 20, information on path loss between various radio stations, and the like, as described above. However, part of these pieces of information may be stored beforehand in the acceptable transmit power setting section 504.

The acceptable transmit power setting section 504 calculates acceptable transmit power at each frequency for each secondary transmitting station 20. Specifically, acceptable transmit power is calculated for each of a secondary transmitting station that has issued a notice regarding a change in the state of frequency use (e.g., a request for start of frequency use), another secondary transmitting station that is managed by the spectrum manager 50 and has been already using a relevant frequency, and a secondary transmitting station that is managed by the other spectrum manager and has been already using the relevant frequency.

Note that a control section (not shown in FIG. 4) that controls the overall operations is provided to the spectrum manager 50 and controls the operations of the above-described network communication section 501, frequency use reception section 502, database information storage section 503, and acceptable transmit power determination section 504. Moreover, the functions of this control section, the frequency use reception section 502, and acceptable transmit power setting section 504 can also be implemented by executing programs stored in a memory (not shown) on a computer (CPU or program-controlled processor).

1.6) Calculation of Acceptable Transmit Power

Hereinafter, a method for calculating acceptable transmit power will be described. Here, it is assumed that a secondary transmitting station that is managed by a relevant spectrum manager 50 and has been already using a frequency and a secondary transmitting station that is managed by another spectrum manager and has been already using the frequency are not differentiated from each other and are represented by an index n=1 to N.

The acceptable transmit power setting section 504 first identifies available frequencies to a secondary transmitting station 20 that has notified a request for start (represented by an index n=0). The available frequencies are frequencies of the primary system service area 12 when the secondary transmitting station 20 is out of, or a predetermined distance apart from the edge of, the primary system service area 12. All available frequencies can be identified by checking this condition against all frequencies (e.g., all TV channels).

In the present exemplary embodiment, the available frequencies to each secondary transmitting station 20 are stored in the database information storage section 503. That is, assuming that a frequency of the primary system is $f_i$ (wherein i (=1 to I) is an index of frequency), a set of the available frequencies to an n-th secondary transmitting station, $[f_{i(n,k)}]$ (wherein i(n,k) is an index of frequency, and k is an index in the set), is registered with the database information storage section 503. For example, when the available frequencies to the n-th secondary transmitting station are $[f_1, f_3, f_6]$, then i(n,1)=1, i(n,2)=3, and i(n,3)=6.

Hereinafter, a description will be given of a method for calculating acceptable transmit power at a frequency $f_i$, assuming that one of the available frequencies to a secondary transmitting station 20 is the frequency $f_i$. However, it is assumed that other secondary transmitting stations are using this frequency $f_i$ as long as this frequency $f_i$ is an available frequency to them. In this case, acceptable transmit power is determined as follows, taking into consideration a case where secondary transmitting stations are using the same frequency to make total interference maximum. That is, assuming that $P(n,f_i)$ is the acceptable transmit power of an n-th secondary transmitting station when it uses the frequency $f_i$ and $P(0,f_i)$ is the acceptable transmit power of a 0-th secondary transmitting station that has notified a request for start when it uses the frequency $f_i$, then interference $I(f_i,m)$ on an m-th primary receiving station is calculated by the following expression (2), and this interference $I(f_i,m)$ needs to be not greater than acceptable interference power $I_{max}(f_i,m)$.

[Math. 2]

$$I(f_i, m) = \frac{P(0, f_i)}{L(0, f_i, m)} + \sum_{n=1}^{N} \frac{P(n, f_i)}{L(n, f_i, m)} \leq I_{max}(f_i, m) \quad (2)$$

Here, when the frequency $f_i$, is not an available frequency to the n-th secondary transmitting station, it is sufficient that acceptable transmit power $P(n,f_i)=0$ (i.e., interference from this n-th secondary transmitting station is not considered) in the expression (2). Moreover, $L(n,f_i,m)$ represents path loss between the n-th secondary transmitting station and the m-th primary receiving station at the frequency $f_i$. This path loss is calculated by using a propagation model such as Hata formula, using information about the secondary transmitting station (location, antenna height, and the like) and information about the primary receiving station (location, antenna height, and the like). This calculation of path loss may be performed by the acceptable transmit power setting section 504, or may be performed by the radio environment database 30 when it registers the information about the secondary transmitting station.

To perform frequency sharing while protecting the primary system, the condition of the expression (2) needs to be satisfied with respect to every primary receiving station (1≤m≤M) that is using the frequency $f_i$. A combination of $P(n,f_i)$ that satisfies this condition, though an infinite number of them exist in general, maybe determined based on an arbitrary policy of the acceptable transmit power setting section 504. For example, a combination can be determined based on the fact that it yields the maximum total communication capacity of the secondary transmitting stations, or that it is an acceptable transmit power combination taking fairness among the secondary transmitting stations into consideration, or the like. Search for an acceptable transmit power combination as described above is performed at frequencies $f_1$ to $f_I$, and at each frequency, a combination of acceptable transmit powers for each secondary transmit station can be obtained.

The acceptable transmit power setting section 504 notifies information about the thus calculated acceptable transmit power at each frequency to the secondary transmitting station 20 that has issued the request for start of frequency use, another secondary transmitting station that is managed by the spectrum manager 50 and has been already using the frequency, and a secondary transmitting station that is managed by the other spectrum manager and has been already using the frequency.

Note that the spectrum manager 50 does not need to notify all available frequencies to a secondary transmitting station 20. That is, some of available frequencies may be selected and notified to a secondary transmitting station 20, and in this event, the remaining frequencies may be set for the value of unavailability (acceptable transmit power is set for 0). For examples of selection criterion, it is possible to select, as available frequencies: those frequencies at which acceptable transmit power is not smaller than a threshold; a predetermined number of frequencies in descending order starting from one at which acceptable transmit power is the greatest; a predetermined number of frequencies in ascending order starting from the frequency corresponding to the smallest number of ones among available frequencies set by other secondary transmitting stations; and the like. The number of frequencies notified as available frequencies is limited in this manner, whereby it is possible to reduce the number of available frequencies that should be substantially considered in calculation of the expression (2) in comparison with a case where all available frequencies are notified. As a result, it is possible to allocate greater acceptable transmit power to a secondary transmitting station that newly starts using a frequency.

1.7) Frequency Management Operation

Figure 5:
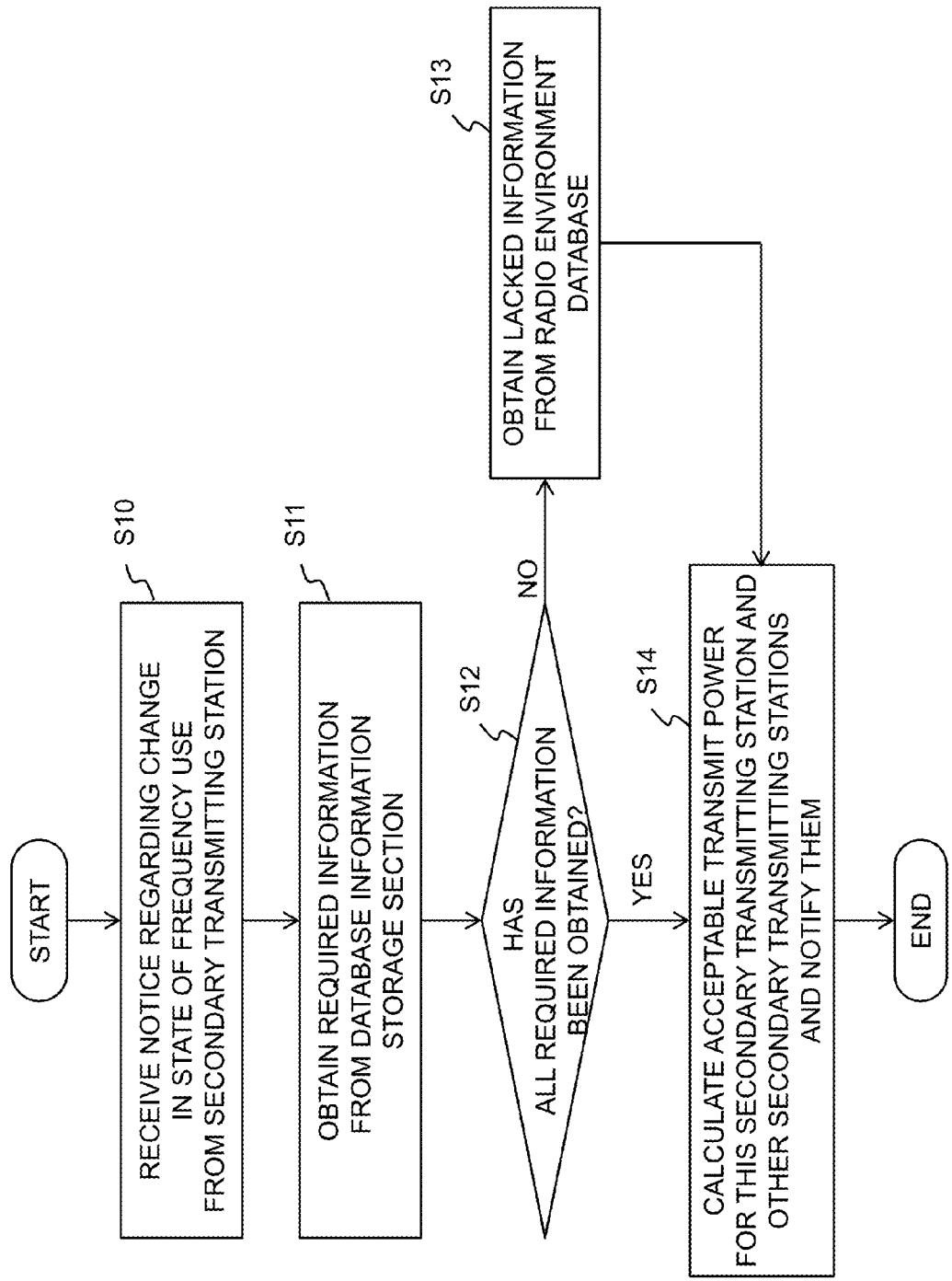
FIG. 5 is a flowchart showing operations of the spectrum manager shown in FIG. 4.

Referring to FIG. 5, the frequency use reception section 502 of the spectrum manager 50 receives, via the network communication section 501, a notice regarding a change in the state of frequency use (a request for start of frequency use or a notice of stop of use) from a secondary transmitting station 20 under management of the spectrum manager 50 (Operation S10).

Subsequently, the frequency use reception section 502 obtains information required to calculate acceptable transmit power from the database information storage section 503 (Operation S11). This information required for calculation includes some or all pieces of information among information about the location, service area, transmit power, antenna height, and antenna directivity of a primary transmitting station 10, the location, antenna height, antenna directivity, and acceptable interference power of a primary receiving station 11, the device ID, location, antenna height, and antenna directivity of a secondary transmitting station 20, and path loss between various radio stations, as described above. If not all required information is stored in the database information storage section 503 (NO at Operation S12), the frequency use reception section 502 accesses the radio environment database 30 via the network communication section 501 and obtains only lacked information from the radio environment database 30 (Operation S13).

When all required information is stored in the database information storage section 503 (YES at Operation S12), or when the lacked information is obtained (Operation S13), the acceptable transmit power setting section 504 accepts a request to calculate acceptable transmit power from the frequency use reception section 502, calculates acceptable transmit power at each frequency for each of the secondary transmitting station that has issued the notice regarding a change in the state of frequency use, another secondary transmitting station that is managed by this spectrum manager and has been already using the relevant frequency, and a secondary transmitting station that is managed by another spectrum manager and has been already using the relevant frequency, and then notifies the calculated acceptable transmit power to the secondary transmitting stations, respectively (Operation S14).

1.8) System Operation Sequence

A description will be given of operations in the entire wireless system in a case where the secondary transmitting stations 20_1 and 20_2 are managed by the spectrum manager 50_1, and the secondary transmitting stations 20_3 and 20_4 are managed by the spectrum manager 50_2, with reference to FIGS. 6 and 7.

<Start of Frequency Use>

Figure 6:
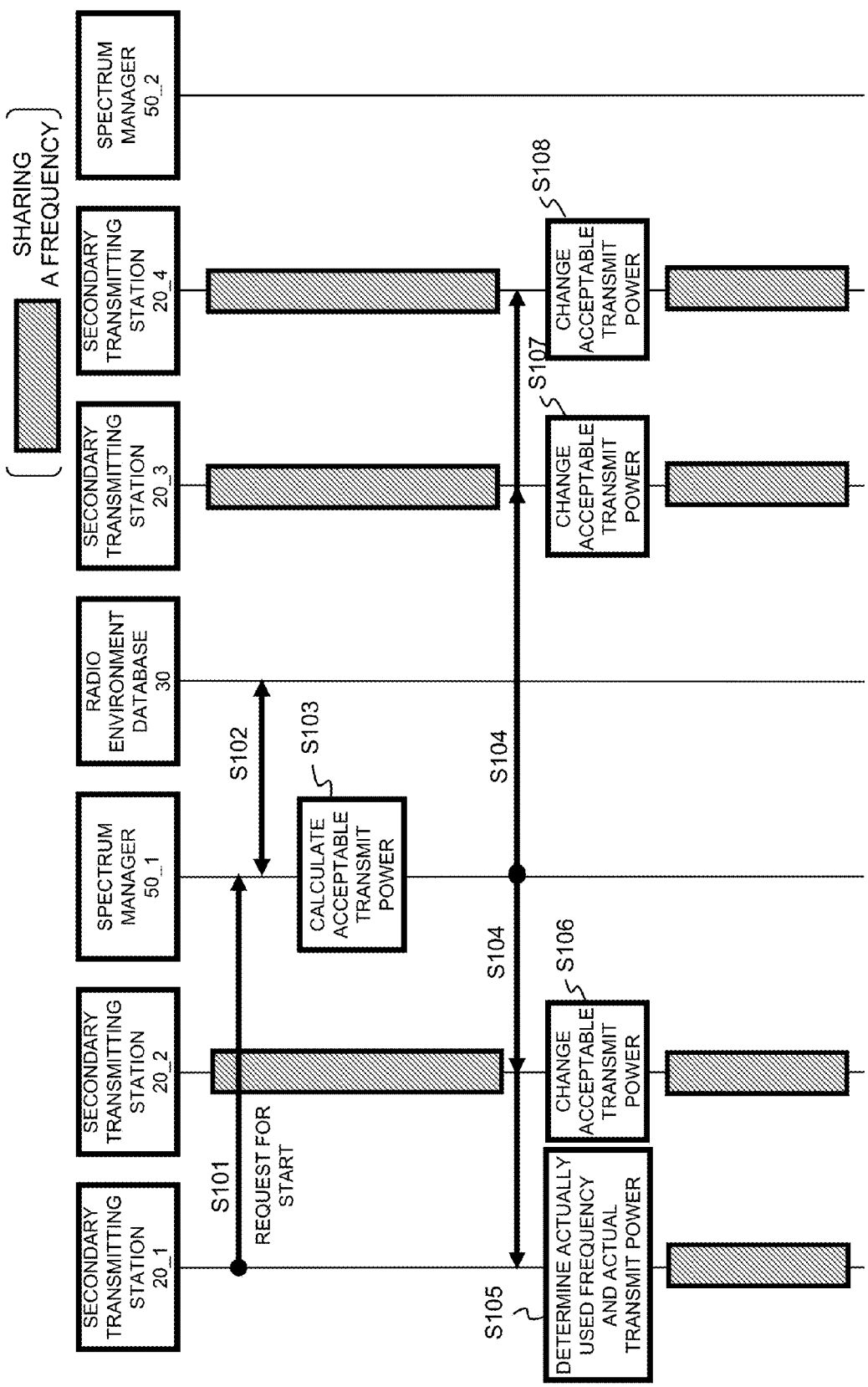
FIG. 6 is a sequence diagram showing operations when a request for start of transmission is issued in the wireless system, according to the first exemplary embodiment.

Referring to FIG. 6, it is assumed that the secondary transmitting station 20_1 is to send a notice regarding a change in the state of frequency use and that the secondary transmitting station 20_2 managed by the same spectrum manager 50_1 and the secondary transmitting stations 20_3 and 20_4 managed by the other spectrum manager 50_2 are using the same frequency. In this state, when the secondary transmitting station 20_1 notifies a request for start of frequency use to the spectrum manager 50_1 (Operation S101), the spectrum manager 50_1 obtains lacked information from the radio environment database 30 as necessary and registers information (Operation S102). When the spectrum manager 50_1 has all required information, the spectrum manager 50_1 calculates acceptable transmit power at each frequency for each secondary transmitting station 20 (Operation S103) and notifies results of calculation not only to the secondary transmitting stations 20_1 and 20_2 managed by this spectrum manager but also to the secondary transmitting stations 20_3 and 20_4 managed by the other spectrum manager (Operation S104).

The secondary transmitting station 20_1 determines an actually used frequency and actual transmit power by using the available frequencies and acceptable transmit power at these available frequenciesm notified from the spectrum manager 50_1 (Operation S105) and starts communication using frequency sharing. Moreover, the secondary transmitting station 20_2 managed by the same spectrum manager 50_1 and the secondary transmitting stations 20_3 and 20_4 managed by the other spectrum manager 50_2 change their actually used frequencies and actual transmit power if necessary following a notified change in acceptable transmit power (Operations S106, S107, and S108) and continue communication using frequency sharing.

<Stop of Frequency Use>

Figure 7:
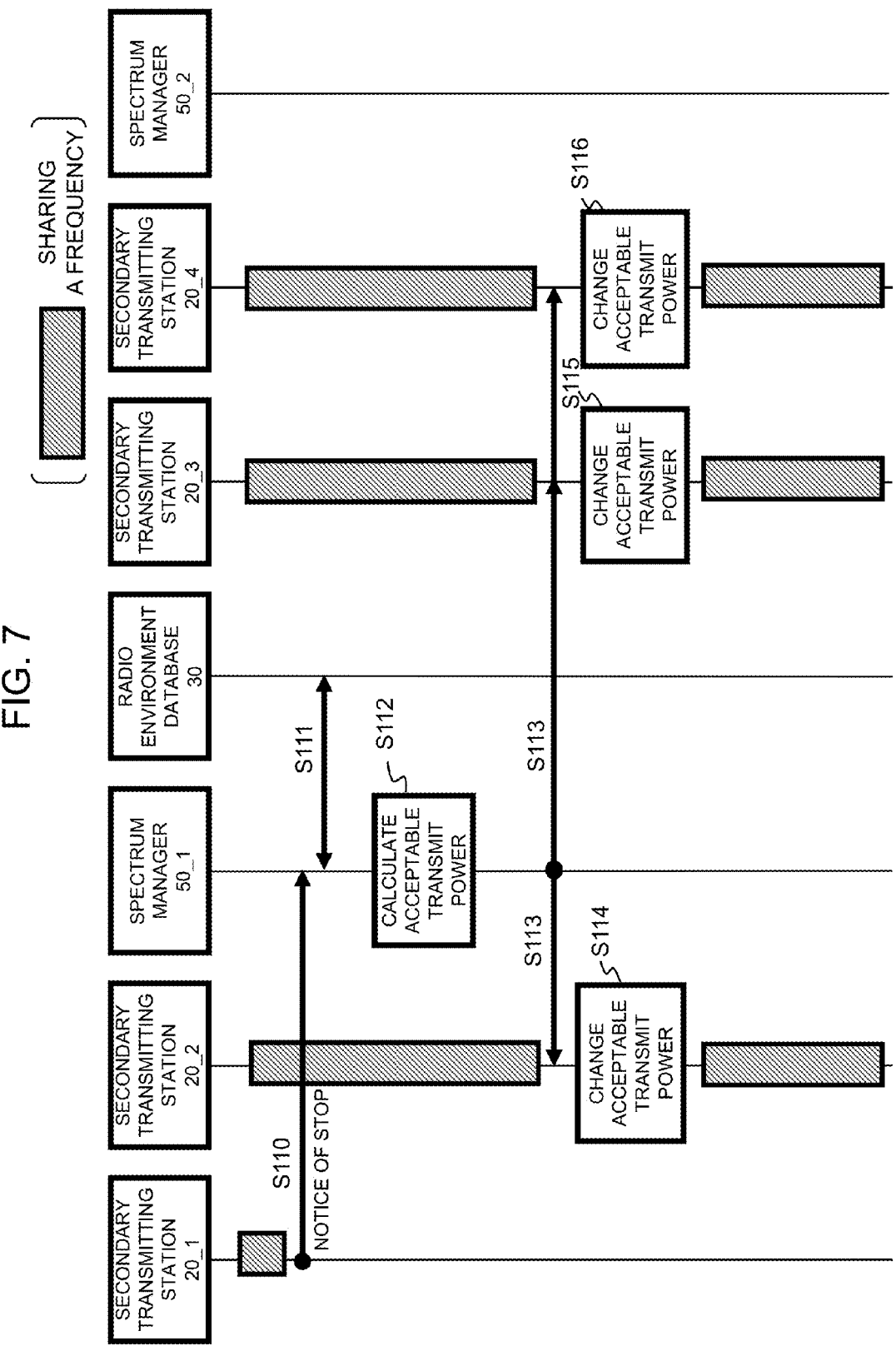
FIG. 7 is a sequence diagram showing operations when a notice of stop of transmission is issued in the wireless system, according to the first exemplary embodiment.

Referring to FIG. 7, when the secondary transmitting station 20_1 notifies stop of frequency use to the spectrum manager 50_1 (Operation S110), the spectrum manager 50_1 registers in the radio environment database 30 the fact that the secondary transmitting station 20_1 has stopped and obtains from the radio environment database 30 information required to calculate acceptable transmit power for the other secondary transmitting stations 20_2 to 20_4 (Operation S111). The calculation of acceptable transmit power is performed by using the above-mentioned expression (2) excluding the term related to the secondary transmitting station 20_1. That is, assuming that the index of the secondary transmitting station 20_1 is n=0, then with the first term $P(0,f_i)/L(0,f_i,m)$ being excluded from the expression (2), acceptable transmit power is calculated for the secondary transmitting station 20_2 managed by the spectrum manager 50_1 and the secondary transmitting stations 20_3 and 20_4 managed by the spectrum manager 50_2 (Operation S112), and results thereof are notified to the secondary transmitting stations 20_2 to 20_4 (Operation S113).

Each of the secondary transmitting stations 20_2 to 20_4 stores the notified value of acceptable transmit power, changes its actually used frequency and actual transmit power if necessary following this change in acceptable transmit power (Operations S114, S115, and S116), and continues communication using frequency sharing.

1.9) Effects

According to the above-described first exemplary embodiment, a spectrum manager receives a notice regarding a change in the state of frequency use (a request for start of frequency use or a notice of stop of use) only from a secondary transmitting station under its own management and calculates acceptable transmit power. Since a plurality of secondary transmitting stations are divided and managed by a plurality of spectrum managers, it is possible to avoid notices of a change in the state of frequency use from being concentrated on a particular spectrum manager. That is, since occasions to calculate acceptable transmit power are not concentrated, it is possible to distribute occasions for calculation among spectrum managers.

Moreover, when a spectrum manager receives a notice regarding a change in the state of frequency use from a secondary transmitting station under its own management, this spectrum manager calculates acceptable transmit power also for other secondary transmitting stations managed by another spectrum manager and notifies them, in addition to secondary transmitting stations under its own management. Accordingly, no redundant calculation processing occurs among different spectrum managers. That is, according to the present exemplary embodiment, when acceptable transmit power is calculated for secondary transmitting stations, it is possible to preclude redundant calculation processing while avoiding concentration of processing load.

According to the first exemplary embodiment, as the basis of maintaining predetermined reception quality at a primary receiving station, suppressing interference power to acceptable interference power or smaller is employed. However, the present invention can be similarly applied even if the basis of maintaining another measure at a predetermined level or higher (maintaining CIR or CINR at a predetermined level or higher) is employed. Moreover, it is also possible to set acceptable transmit power such that the degree of degradation of CIR or CINR at a primary receiving station caused by transmission performed by a secondary transmitting station is suppressed to a predetermined value or lower. Additionally, the system architecture shown in FIG. 2 is an example for describing the first exemplary embodiment, and the present invention is not limited to this.

2. Second Exemplary Embodiment

In the above-described first exemplary embodiment, a description is given of a case where an actually used frequency and actual transmit power are not notified to a spectrum manager. However, in a second exemplary embodiment, a description will be given of a case where they are notified. The use of the actual state of frequency use (actually used frequencies and actual transmit power) makes it possible to proactively perform frequency sharing.

An actually used frequency and actual transmit power are notified when a secondary transmitting station 20 starts frequency sharing, or requests to change actual transmit power during frequency sharing, or requests to change an actually used frequency. In this case, since a spectrum manager 50 knows the actually used frequency and actual transmit power of each secondary transmitting station 20, it is easier to grasp the state of interferences caused by the secondary transmitting stations 20, whereby it is possible to more proactively perform frequency sharing.

2.1) System Architecture

A system architecture according to the second exemplary embodiment of the present invention is similar to the architecture according to the first exemplary embodiment shown in FIGS. 2 to 4. Accordingly, the same reference signs are given, and a description thereof will be omitted.

2.2) Operation

Figure 8:
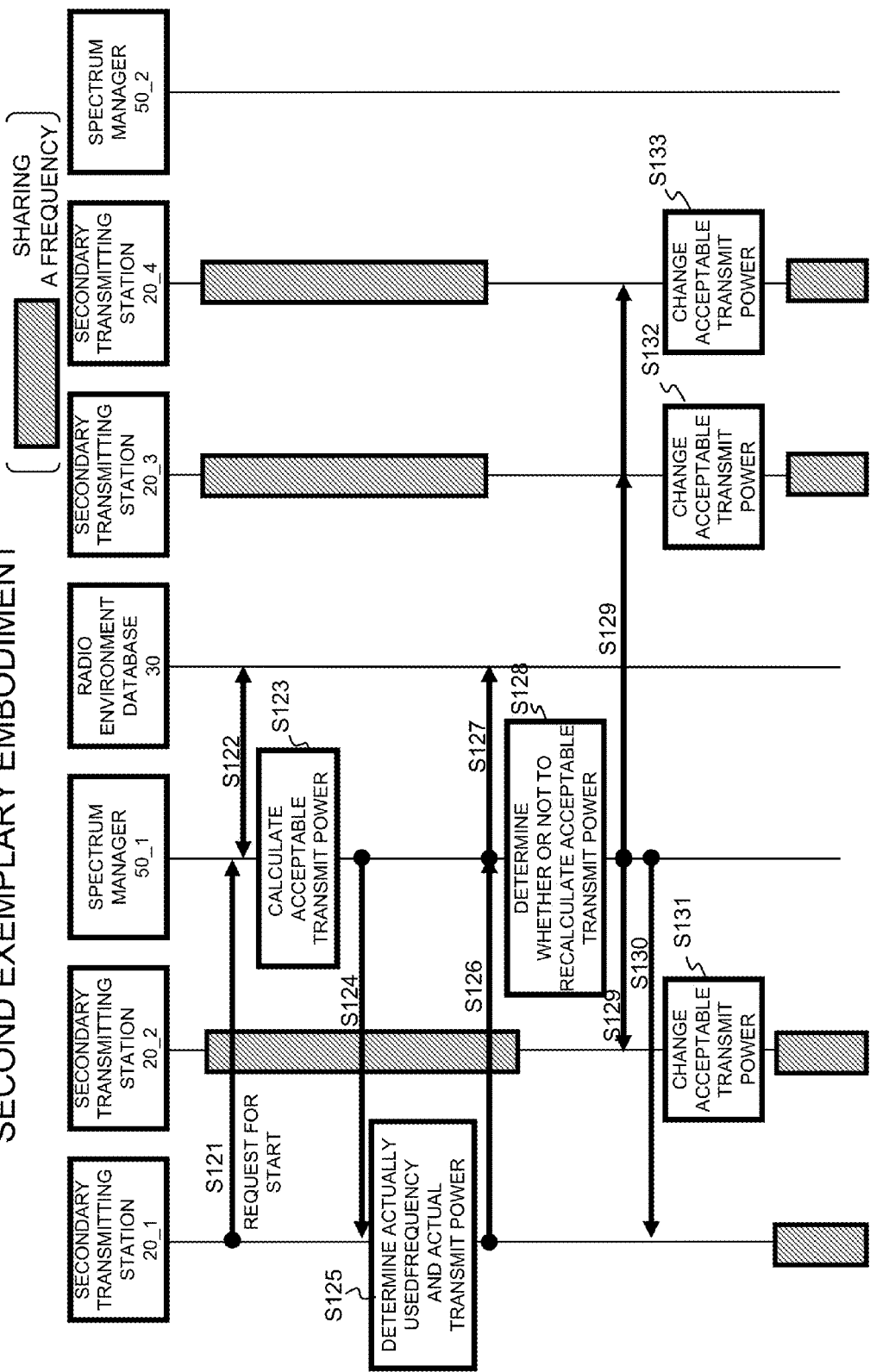
FIG. 8 is a sequence diagram showing operations when a request for start of transmission is issued in the wireless system, according to a second exemplary embodiment.

Referring to FIG. 8, a request for start from the secondary transmitting station 20_1 (Operation S121), and the obtainment of required information from the radio environment database 30 and the registration of information (Operation S122) are similar to Operations S101 and S102 in FIG. 6, respectively.

Subsequently, the spectrum manager 50_1 calculates acceptable transmit power for the secondary transmitting station 20_1 (Operation S123). In this example, since it is assumed that all secondary transmitting stations notify their actually used frequencies and actual transmit power, it is assumed that information on the actually used frequencies and actual transmit power of those secondary transmitting stations 20 that have been already using a frequency of the primary system is stored in the radio environment database 30 or the database information storage section 503. Accordingly, on the premise that the secondary transmitting stations (20_2, 20_3, and 20_4) that have been already using a frequency are using the actually used frequency stored, the spectrum manager 50_1 determines acceptable transmit power for the secondary transmitting station 20_1 that has notified a request for start and the other secondary transmitting stations (20_2, 20_3, and 20_4).

A method for calculating acceptable transmit power is basically similar to that of the first exemplary embodiment described above, in which an actually used frequency and actual transmit power are not notified. The different point in the second exemplary embodiment is that $P(n,f_i)=0$ in the expression (2) when the frequency $f_i$ is not an actually used frequency, while in the first exemplary embodiment, $P(n,f_i)=0$ when the frequency $f_i$ is not an available frequency to an n-th secondary transmitting station that is using a frequency.

Moreover, a condition $(P(n,f_i) \leq P_{Desired})$ for acceptable transmit power not to exceed a transmit power desired value $(P_{Desired})$ is established, which will be described later. However, this condition is not set on a secondary transmitting station for which a transmit power desired value is not set. Acceptable transmit power is searched for as a combination of $P(n,fi)$ that satisfies the condition concerning the transmit power desired value and the condition of the expression (2). The condition concerning the transmit power desired value is established, so that excessive acceptable transmit power exceeding desired transmit power will not be allocated to a secondary transmitting station, thereby increasing acceptable transmit power for other secondary transmitting stations by that amount.

Although an almost unlimited number of acceptable transmit power combinations exist in general, it is possible to determine a combination based on an arbitrary policy of the acceptable transmit power setting section 504, such as, for example, a combination that yields the maximum total communication capacity of the secondary transmitting stations, an acceptable transmit power combination taking fairness among the secondary transmitting stations into consideration, an acceptable transmit power combination that makes a smaller amount of degradation in comparison with the current actual transmit power, or the like.

Moreover, the above-mentioned transmit power desired value ($P_{Desired}$) can be set as follows. The spectrum manager 50_1, when receiving an actually used frequency and actual transmit power determined by the secondary transmitting station 20_1, compares the transmit power desired by the secondary transmitting station 20_1 with acceptable transmit power. When the desired transmit power is smaller than the acceptable transmit power, actual transmit power is set to a value lower than the acceptable transmit power. At this time, the spectrum manager 50_1 retains the notified actual transmit power as the transmit power desired value of the secondary transmitting station 20_1. On the other hand, when the transmit power desired by the secondary transmitting station 20_1 is greater than the acceptable transmit power, actual transmit power is set to a value equal to the acceptable transmit power. At this time, a transmit power desired value is not set for the secondary transmitting station 20_1. Furthermore, as another method, when the secondary transmitting station 20_1 notifies actual transmit power and an actually used frequency, a transmit power desired value for the secondary transmitting station 20_1 may be also notified to the spectrum manager.

Next, the calculated acceptable transmit power at each frequency of the secondary transmitting station 20_1 is notified to the secondary transmitting station 20_1 (Operation S124). The secondary transmitting station 20_1 determines an actually used frequency and actual transmit power based on the acceptable transmit power at each frequency (Operation S125). The secondary transmitting station 20_1 notifies the determined actually used frequency and actual transmit power to the spectrum manager 50_1 (Operation 126).

When receiving the notification of the actually used frequency and actual transmit power, the spectrum manager 50_1 registers the notified actually used frequency and actual transmit power into the radio environment database 30 (Operation S127).

Subsequently, the spectrum manager 50_1 compares the actual transmit power notified by the secondary transmitting station 20_1 with the acceptable transmit power at the actually used frequency and determines whether or not to recalculate acceptable transmit power for the other secondary transmitting stations (20_2, 20_3, and 20_4) (Operation S128). When they match each other as a result of comparison, the recalculation of acceptable transmit power is not performed, and a combination in the case of using the actually used frequency notified from the secondary transmitting station 20_1 is selected among acceptable transmit power combinations that have been already calculated. This information on acceptable transmit power is notified to the other secondary transmitting stations (20_2, 20_3, and 20_4) (Operation S129).

On the other hand, the recalculation of acceptable transmit power is performed when the actual transmit power is smaller than the acceptable transmit power, and also when, of the other secondary transmitting stations (20_2, 20_3, and 20_4), there is a transmitting station whose calculated acceptable transmit power is smaller than the transmit power desired value or a transmitting station for which a transmit power desired value is not set.

A reason to recalculate acceptable transmit power is that when the secondary transmitting station 20_1 uses actual transmit power smaller than acceptable transmit power, an excess over the limit of the acceptable interference power is produced, and it is therefore possible to allocate this excess to another secondary transmitting station whose acceptable transmit power is smaller than the desired value. In recalculation of acceptable transmit power, the desired value of the secondary transmitting station 20_1 and the desired value of a secondary transmitting station whose acceptable transmit power is equal to the transmit power desired value are fixed as their respective acceptable transmit power, and acceptable transmit power is recalculated for a secondary transmitting station whose acceptable transmit power is smaller than its transmit power desired value. The spectrum manager 50_1 notifies information on the calculated acceptable transmit power to other secondary transmitting stations (20_2, 20_3, and 20_4) (Operation S129).

Subsequently, the spectrum manager 50_1 returns acknowledgement notification to the secondary transmitting station 20_1 in response to the notification of the actually used frequency and actual transmit power (Operation S130), and the secondary transmitting station 20_1 thereby starts transmission. Moreover, each of the secondary transmitting stations (20_2, 20_3, and 20_4) that have been already using the frequency stores the notified value of acceptable transmit power as a new set value, changes its actually used frequency and actual transmit power if necessary following this change in acceptable transmit power, and continues transmission (Operations S131, S132, and S133).

2.3) Effects

As described above, an actually used frequency and actual transmit power are notified to a spectrum manager, and using this information, acceptable transmit power is determined for a secondary transmitting station, whereby it is possible to estimate interference based on the more accurate state of use than in a case where such notification is not performed and acceptable transmit power is determined by using available frequencies. Specifically, when interference power in the expression (2) is estimated, it is possible to consider only those secondary transmitting stations that are actually using each frequency, and thus to eliminate those secondary transmitting stations that may use the frequency (which is one available frequency) but are not actually using the frequency. Thus, since interference that does not exist in actuality does not need to be considered, it is possible to allocate larger acceptable transmit power to a secondary transmitting station or to allow more secondary transmitting stations to share the same frequency.

Moreover, when acceptable transmit power is calculated, acceptable transmit power is set so as not to exceed the transmit power desired value of a secondary transmitting station, whereby it is possible to increase the acceptable transmit power of a secondary transmitting station to which smaller acceptable transmit power is allocated.

Further, acceptable transmit power is recalculated when actual transmit power notified from a secondary transmitting station is smaller than acceptable transmit power and also when the acceptable transmit power of another secondary transmitting station is smaller than its desired value, whereby it is possible to allocate an excess over the limit of the acceptable transmit power to another secondary transmitting station whose acceptable transmit power is smaller than its desired value and thus to increase its acceptable transmit power.

Note that although a description is given of an example in which a secondary transmitting station notifies an actually used frequency and actual transmit power to a spectrum manager in the present exemplary embodiment, this is not a limitation. For example, a secondary transmitting station may notify, as potential frequencies for use, multiple frequencies including an actually used frequency among available frequencies to a spectrum manager.

Furthermore, it is also possible that a secondary transmitting station notifies a spectrum manager of transmit power that is greater than actual transmit power and is smaller than acceptable transmit power. In this case, the secondary transmitting station changes its actually used frequency and actual transmit power within the ranges of the notified frequencies and transmit power, while the spectrum manager estimates interference power in the expression (2) within the ranges of the notified frequencies and transmit power. Thus, the secondary transmitting station can secure flexibility to change its actually used frequency and actual transmit power within the ranges of the notified frequencies and transmit power, while the spectrum manger can estimate interference power, with limited frequencies and transmit power with higher possibility.

Note that although a request for start of frequency use is assumed as a "notice regarding a change in the state of frequency use" in the description of the present exemplary embodiment, it may be a notice of stop of frequency use as described in the first exemplary embodiment.

Other conceivable "notices of a change in the state of frequency use" include a request to change transmit power and a request to change frequencies. A request to change transmit power is notified to a spectrum manager when a secondary transmitting station desires to change its actual transmit power once determined. For example, this applies to a case where a secondary transmitting station increases transmit power to enlarge its coverage, or to a case where a secondary transmitting station decreases transmit power for power saving.

Similarly, a request to change frequencies is notified to a spectrum manager when a secondary transmitting station desires to change its actually used frequency once determined. For example, this applies to a case where at the actually used frequency of a secondary transmitting station, interference from another secondary system on the secondary system of interest has increased, or the like.

Whether a "notice regarding a change in the state of frequency use" is a request to change transmit power or a request to change frequencies, a spectrum manger similarly calculates acceptable transmit power at each frequency for each of a secondary transmitting station that has issued the notice, another secondary transmitting station that is managed by the spectrum manager and has been already using a frequency, and a secondary transmitting station that is managed by another spectrum manager and has been already using a frequency.

3. Third Exemplary Embodiment

Figure 9:
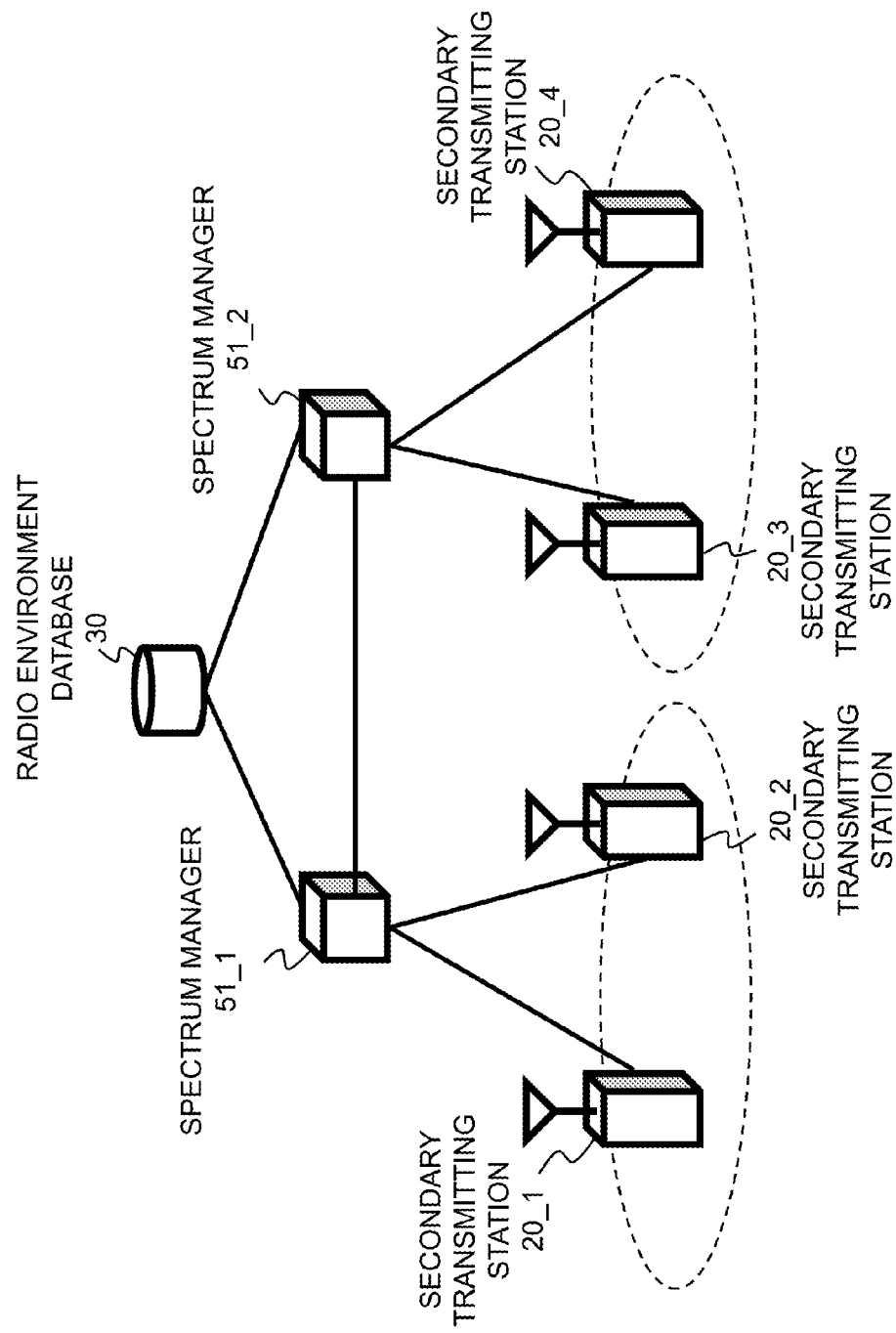
FIG. 9 is a system architecture diagram for describing a wireless system according to a third exemplary embodiment of the present invention.

Referring to FIG. 9, a wireless communication system according to a third exemplary embodiment of the present invention includes secondary transmitting stations 20 (20_1 to 20_4), spectrum managers 51 (51_1 and 51_2), and a radio environment database 30, wherein each spectrum manager is communicably connected to the secondary transmitting stations under its own management, and further the spectrum managers 51_1 and 51_2 are communicably connected to each other.

In the system architecture of FIG. 9, when a spectrum manager 51 (e.g., 51_1) calculates acceptable transmit power for other secondary transmitting stations 20 out of its own management (e.g., 20_3 and 20_4), this spectrum manager 51 notifies the acceptable transmit power, which is results of calculation, to the other spectrum manger 51 (e.g., 51_2) managing these other secondary transmitting stations 20, and the other spectrum manager 51 notifies the acceptable transmit power, the results of calculation, to the other secondary transmitting stations (e.g., 20_3 and 20_4). Since the configurations and operations of the secondary transmitting stations 20 and the radio environment database 30 are similar to those of the first exemplary embodiment, the same reference signs are given and a description thereof will be omitted. The spectrum manager 51 according to the present exemplary embodiment is basically similar to the spectrum manager 50 according to the first exemplary embodiment, but is different in that upon receiving acceptable transmit power that is results of calculation from another spectrum manager, the spectrum manager 51 transfers it to a secondary transmitting station under its own management. Hereinafter, the configuration and operations of the spectrum manager 51 will be described by illustrating the spectrum manager 51_1.

Figure 10:
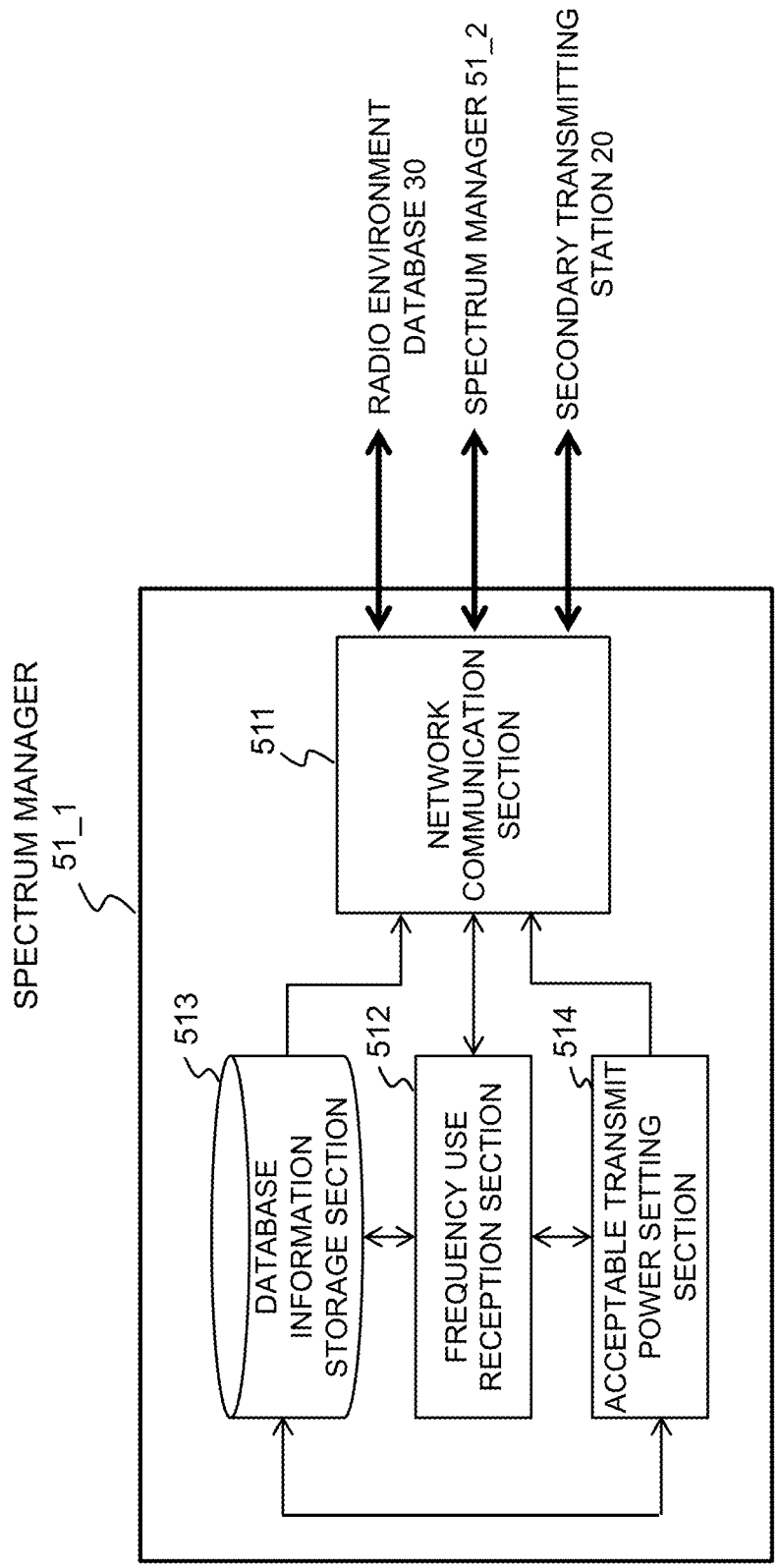
FIG. 10 is a block diagram showing a schematic configuration of a frequency management apparatus (spectrum manager) according to the third exemplary embodiment.

Referring to FIG. 10, the spectrum manager 51_1 is basically similar to the spectrum manager 50 in the first exemplary embodiment shown in FIG. 4, but is different in that the network communication section 511 has an interface with the other spectrum manager 51_2. Moreover, another different point is that when receiving acceptable transmit power for secondary transmitting stations under management of the spectrum manager 51_1, which has been calculated by the other spectrum manager 51_2, the spectrum manager 51_1 stores this information in the database information storage section 513 and then notifies the acceptable transmit power to the secondary transmitting stations 20 (20_1 and 20_2) under its own management. Thus configured, the spectrum manager 51_1 can grasp information related to the secondary transmitting stations 20_1 and 20_2 under its own management.

4. Fourth Exemplary Embodiment

Figure 11:
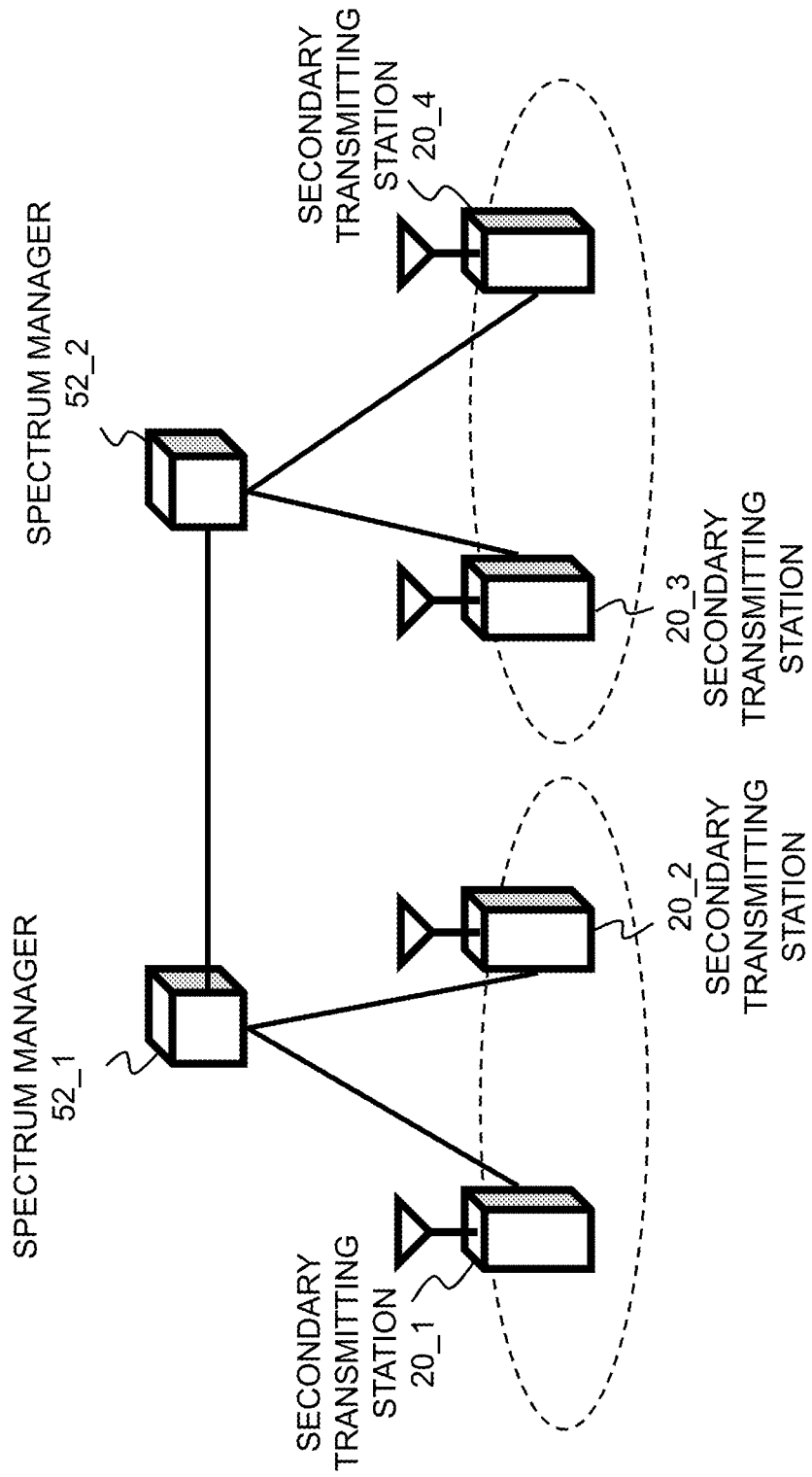
FIG. 11 is a system architecture diagram for describing a wireless system according to a fourth exemplary embodiment of the present invention.

Referring to FIG. 11, a wireless system according to a fourth exemplary embodiment of the present invention includes secondary transmitting stations (20_1 to 20_4) and spectrum managers 52 (52_1 and 52_2), and is different from the second exemplary embodiment in that the radio environment database 30 is not provided to the external of the spectrum managers 52.

Figure 12:
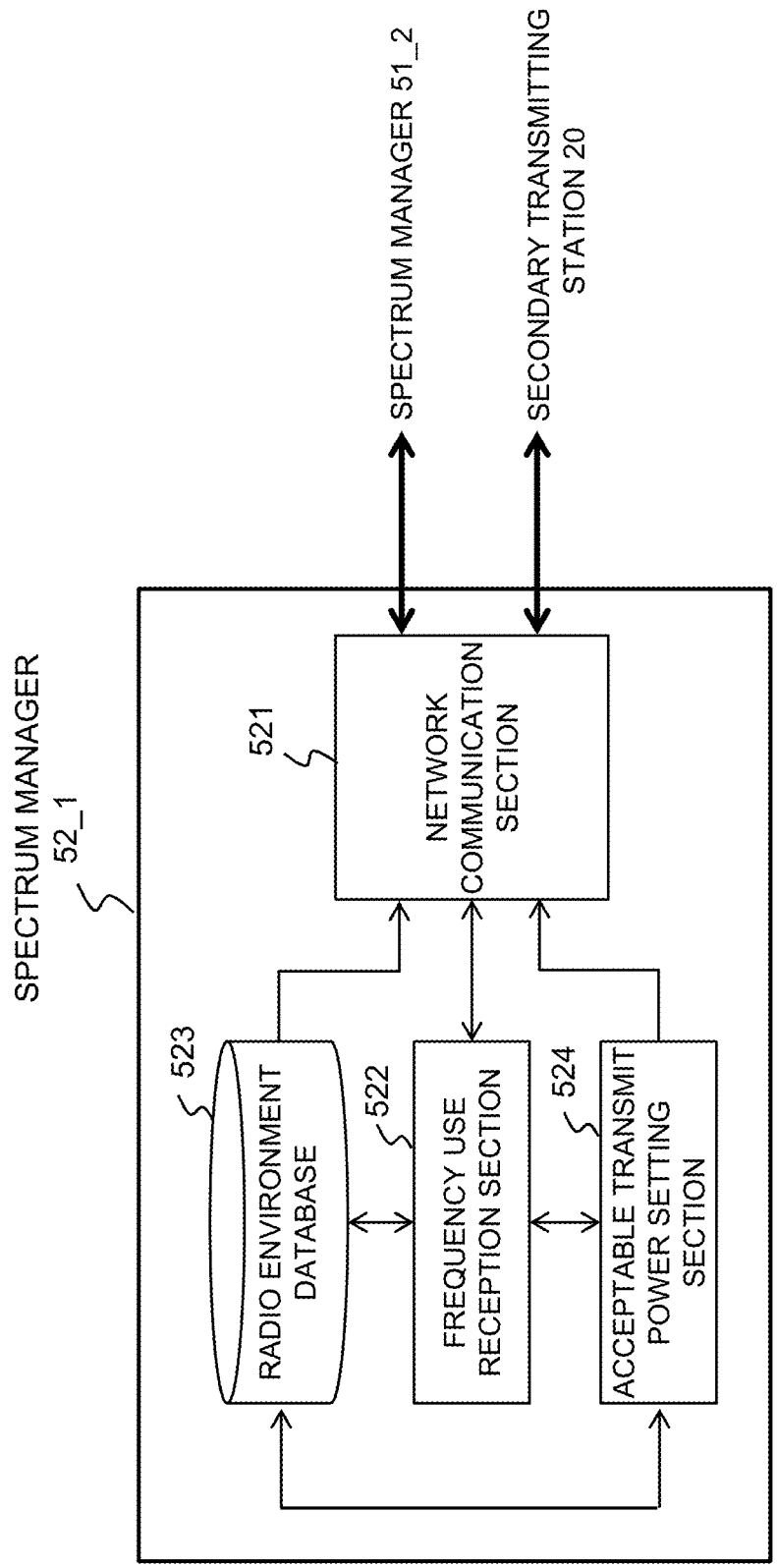
FIG. 12 is a block diagram showing a schematic configuration of a frequency management apparatus (spectrum manager) according to the fourth exemplary embodiment.

FIG. 12 shows the configuration of the spectrum manager 52 in the system architecture of FIG. 11. Here, the configuration of the spectrum manager 52_1 is illustrated. Referring to FIG. 12, the spectrum manager 52_1 has a radio environment database 523 within itself. That is, each of the plurality of spectrum managers 52 has the radio environment database 523. Accordingly, each spectrum manager 52 has a function of mutually communicating via the network communication section 521 and thereby synchronizing respective information stored in the radio environment database 523 with each other.

Information stored in the radio environment databases 523 is synchronized in this manner, whereby even the system architecture without the radio environment database 30 externally provided allows similar operations to be performed as in the above-described first to third exemplary embodiments.

5. Fifth Exemplary Embodiment

In a fifth exemplary embodiment of the present invention, acceptable transmit power is calculated, differently from the first exemplary embodiment, using an interference reach area, which is the reach of interference from a secondary transmitting station in geographical terms. For the clarity of description, only different points from the first exemplary embodiment will be described.

In the first exemplary embodiment, when a secondary transmitting station makes a change in the state of frequency use (start of use of a frequency, stop of use of a frequency, or the like), a spectrum manager 50 calculates acceptable transmit power for secondary transmitting stations including those managed by another spectrum manager and notifies them, as described already. On the other hand, in the firth exemplary embodiment of the present invention, when acceptable transmit power is calculated, secondary transmitting stations needed to be considered as calculation targets are limited, thereby increasing efficiency in calculation.

That is, the expression (2) described in the first exemplary embodiment can be rewritten as the following expression (3), assuming that a set of the indices n of calculation-target secondary transmitting stations is $S \subseteq [1, 2, \ldots, N]$.

[Math. 3]

$$I(f_i, m) = \frac{P(0, f_i)}{L(0, f_i, m)} + \sum_{n \in S} \frac{P(n, f_i)}{L(n, f_i, m)} \leq I_{max}(f_i, m) \quad (3)$$

However, a secondary transmitting station of n=0 is excluded from the set S because it is a transmitting station that notifies a request for start of frequency use and is therefore always a calculation target. In the expression (3), if the number of calculation-target secondary transmitting stations (the number of elements in S) can be reduced, the volume of calculation for searching for an acceptable transmit power combination can be reduced.

Hereinafter, interference reach areas will be used to find the set S of calculation-target secondary transmitting stations. First, an interference reach area indicates an area where interference substantially reaches out geographically when a secondary transmitting station performs transmission with maximum transmit power. Here, "maximum transmit power" is assumed to be an upper-limit value of transmit power based on the hardware limit of a secondary transmitting station, or an upper-limit value (a maximum value of acceptable transmit power) in the range of transmit power allowed by frequency rules or the like when frequency sharing is performed, or the like. Moreover, for a secondary transmitting station that has been already using a frequency, "maximum transmit power" may be acceptable transmit power because the spectrum manger 50 knows acceptable transmit power. In a case where the spectrum manager 50 manages actual transmit power, "maximum transmit power" may be actual transmit power. Accordingly, the interference reach area depends on this maximum transmit power and path loss from a secondary transmitting station toward its periphery and indicates an area in which interference power is estimated at not smaller than a threshold $I_{Th}$ that is regarded as a sufficiently small value. Moreover, for another method for determining the interference reach area, it is possible to simply determine that an area within a predetermined distance is an interference reach area.

Figure 13:
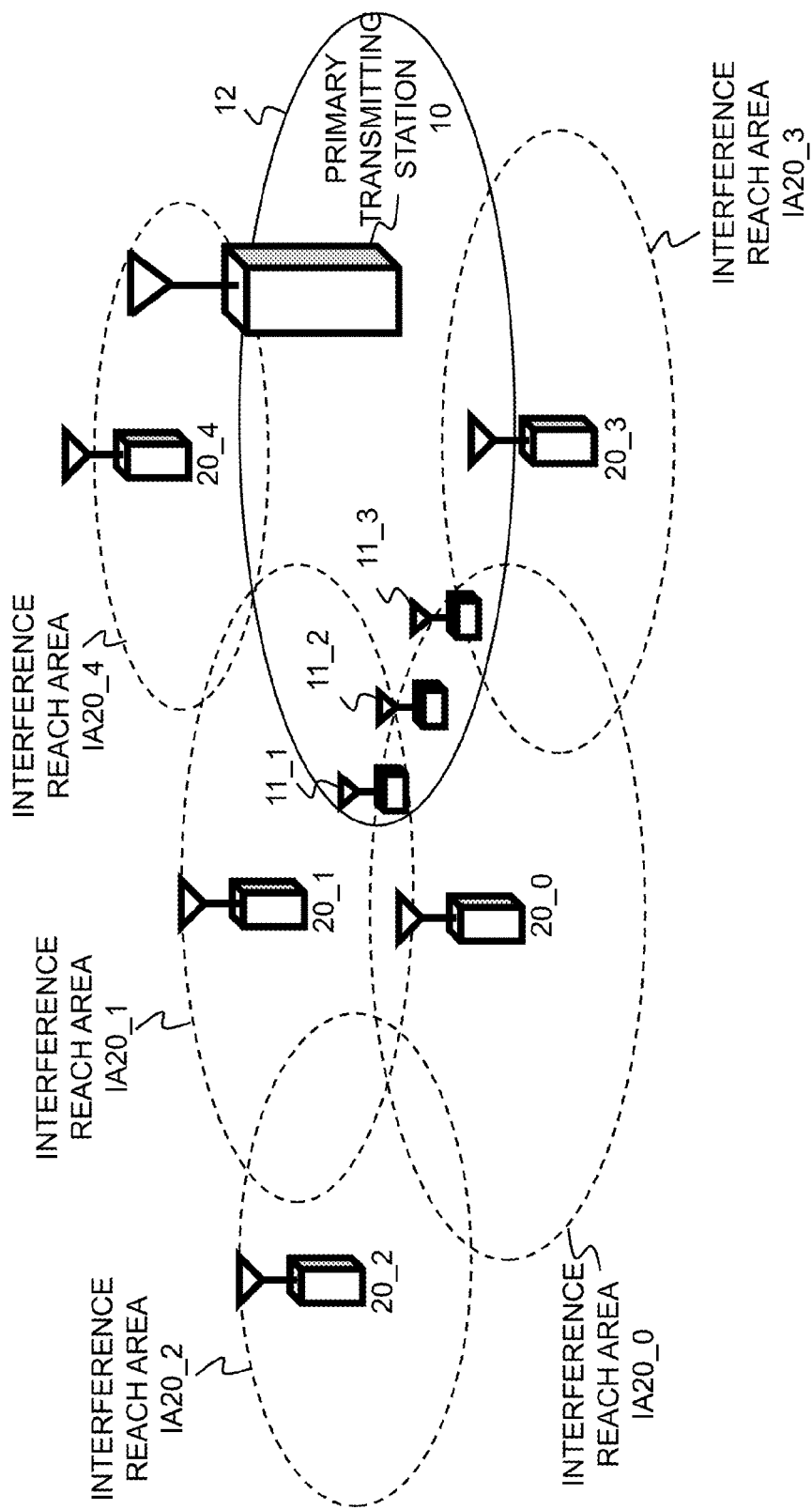
FIG. 13 is a system architecture diagram for describing a wireless system according to a fifth exemplary embodiment of the present invention.

Referring to FIG. 13, in the wireless system according to the present exemplary embodiment, it is assumed that primary receiving stations 11_1 to 11_3 exist in a primary service area 12 of a primary transmitting station 10, that secondary transmitting stations 20_0 to 20_4 exist in the vicinity of the primary service area 12, and that the secondary transmitting stations 20_0 to 20_4 have interference reach area IA20_0 to IA20_4, respectively. As for primary receiving stations 11, only the primary receiving stations 11_1 to 11_3 overlapping with the interference reach areas of their adjacent secondary transmitting stations are shown here for the convenience of description although other primary receiving stations exist in actuality because they are assumed to exist on a grid within the primary system service area 12. Hereinafter, a description will be given of a method for calculating acceptable transmit power in a case where the secondary transmitting station 20_0 newly starts using a frequency, assuming that the secondary transmitting stations 20_1 to 20_4 have been already using a frequency.

First, assuming that the secondary transmitting station 20_0 has started transmission with maximum transmit power, then interference increases within the interference reach area IA20_0 of the secondary transmitting station 20_0. Accordingly, it is the interference reach areas IA20_1, IA20_2, and IA20_3 overlapping with the interference reach area IA20_0 where the sum of interference may increase due to the transmission by the secondary transmitting station 20_0, and the acceptable transmit power of the secondary transmitting stations 20_1, 20_2, and 20_3 may be affected. Accordingly, the secondary transmitting station 20_4 whose interference reach area does not overlap is excluded from calculation targets, and hence the set S of the indices n of calculation-target secondary transmitting stations is S=[1, 2, 3].

Overlaps between the primary system service area 12 and interference reach areas are further taken into consideration, whereby the number of calculation-target secondary transmitting stations can be further reduced. Considering a common area between the secondary transmitting station's interference reach area IA20_0 and the primary system service area 12, interference on the primary receiving stations 11_1 to 11_3 increases within the primary system service area 12. Moreover, the primary receiving station 11_1 is within the interference reach area IA20_1, while the primary receiving station 11_3 is within the interference reach area IA20_3. Accordingly, it is the interference reach areas IA20_1 and IA20_3 where the sum of interference from the multiple secondary transmitting stations on the primary receiving stations may increase due to the transmission by the secondary transmitting station 20_0, and therefore the secondary transmitting stations thereof are made to be targets of acceptable transmit power calculation.

On the other hand, there is no primary receiving station in an overlap between the interference reach areas of the secondary transmitting stations 20_2 and 20_0. Accordingly, the effect of interference with the secondary transmitting station 20_2 does not need to be considered in calculation, and hence the set S of the indices n of calculation-target secondary transmitting stations is S=[1, 3].

Moreover, at this time, a combination of the acceptable transmit power of the secondary transmitting stations 20_0, 20_1, and 20_3 is searched for, considering the primary receiving stations 11_1 to 11_3 as m in the expression (2). Here, the smaller one of the acceptable transmit power obtained for the combination and the hitherto used acceptable transmit power is determined to be new acceptable transmit power for the secondary transmitting stations 20_1 and 20_3, which have been already using the relevant frequency. By selecting smaller acceptable transmit power, it is possible to also protect other primary receiving stations (primary receiving stations (not shown) existing in an overlap between the interference reach area IA20_1 and the primary system service area 12 and in an overlap between the interference reach area IA20_1 and the primary system service area 12) than the primary receiving stations 11_1 to 11_3.

As described above, according to the fifth exemplary embodiment, interference reach areas are taken into consideration, whereby it is possible to eliminate unnecessary secondary transmitting stations from targets of acceptable transmit power calculation. Specifically, a secondary transmitting station whose interference reach area does not overlap with that of a secondary transmitting station that has issued a notice regarding a change in the state of frequency use is excluded from targets of acceptable transmit power calculation. Thus, it is possible to include only those secondary transmitting stations involved in an increase in the sum of interference, in targets of acceptable transmit power calculation.

Further, when an overlap between the interference reach areas of the secondary transmitting station issuing a notice regarding a change in the state of frequency use and another secondary transmitting station does not overlap with the primary system service area, this other secondary transmitting station is excluded from targets of acceptable transmit power calculation. Thus, it is possible to include only those secondary transmitting stations of which the sum of interference affects interference on primary receiving stations, in targets of acceptable transmit power calculation.

6. Sixth Exemplary Embodiment

According to a sixth exemplary embodiment of the present invention, spectrum managers manage secondary transmitting stations for each frequency. Moreover, acceptable transmit power is calculated, taking into consideration interference reach frequencies, which are the reach of interference from a secondary transmitting station in frequency direction. For the clarity of description, only different points from the fifth exemplary embodiment will be described.

In the present exemplary embodiment, spectrum mangers manage notices of a change in the state of frequency use (requests for start of frequency use, stops of frequency use, and the like) from secondary transmitting stations on a frequency basis. That is, to a spectrum manager, a secondary transmitting station making a notice regarding a change in the state of frequency use at a frequency of its management target corresponds to a secondary transmitting station under its own management in the fifth exemplary embodiment. Hereinafter, a description will be given of an example in which secondary transmitting stations perform transmission at frequencies f1 to f8 and are managed by spectrum managers based on each transmit frequency.

Figure 14:
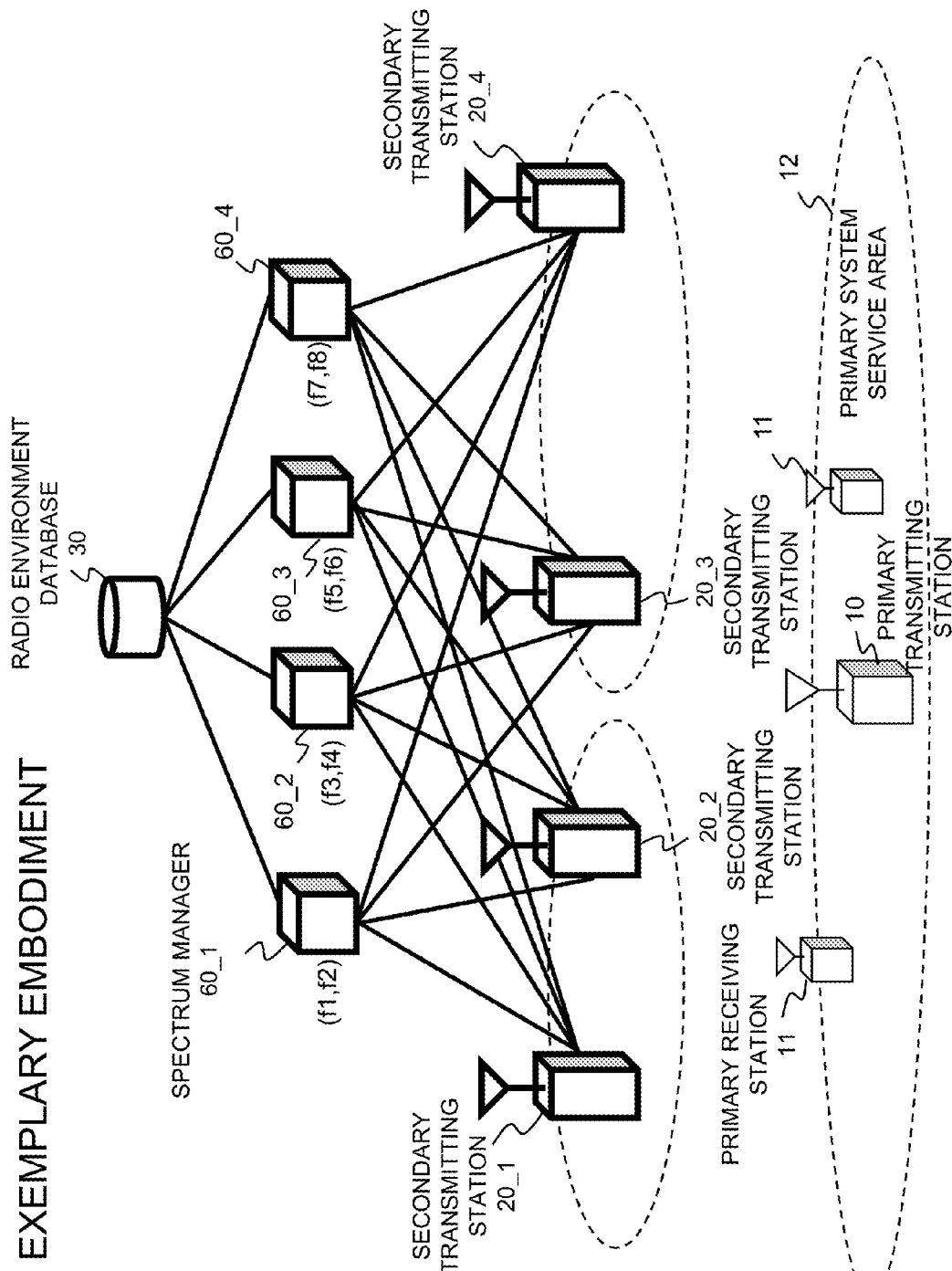
FIG. 14 is a system architecture diagram for describing a wireless system according to a sixth exemplary embodiment of the present invention.

Referring to FIG. 14, it is assumed that the management targets of a spectrum manager 60_1 are center frequencies f1 and f2, those of a spectrum manager 60_2 are center frequencies f3 and f4, those of a spectrum manager 60_3 are center frequencies f5 and f6, and those of a spectrum manager 60_4 are center frequencies f7 and f8. In a system architecture according to the present exemplary embodiment, each secondary transmitting station has an interface with each of the spectrum managers 60 managing different frequencies. Thus configured, each secondary transmitting station can notify a request for start of frequency use to any spectrum manager 60.

Figure 15:
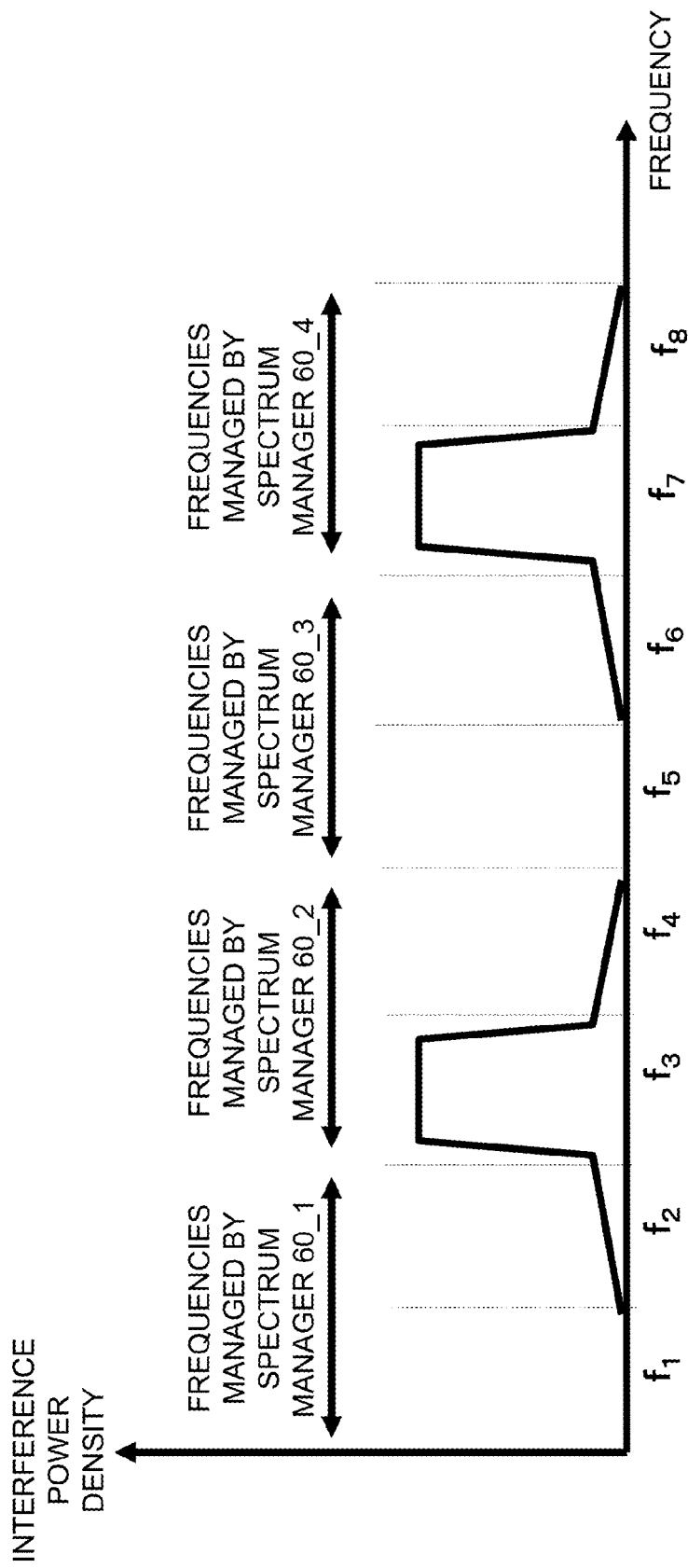
FIG. 15 is a graph of interference power density for describing effects on adjacent frequencies in a wireless communication system according to the sixth exemplary embodiment.

Moreover, in the present exemplary embodiment, it is also assumed that a secondary signal interferes even with a primary receiving station that is using an adjacent frequency. FIG. 15 shows that secondary signals whose center frequencies are frequencies f3 and f7 interfere with their respective adjacent frequencies. Interference on a primary receiving station using an adjacent frequency occurs due to a combination of an adjacent channel leakage ratio and an adjacent channel selectivity. The adjacent channel leakage ratio represents leakage power from a transmit frequency of a secondary transmitting station to an adjacent frequency. The adjacent channel selectivity represents part of a signal in the center frequency band of a secondary signal picked up by a primary receiving station's reception filter whose center is the adjacent frequency.

A spectrum manager 60 managing a predetermined frequency receives a notice regarding a change in the state of frequency use at this frequency issued by a secondary transmitting station 20, calculates acceptable transmit power for those secondary transmitting stations that are using mutually affecting frequencies as calculation targets, and notifies the acceptable transmit power to the respective secondary transmitting stations.

Here, since adjacent frequencies cause interference with each other, the management targets of a spectrum manager 60 are made to be contiguous frequencies as in the present exemplary embodiment, whereby it is possible to limit secondary transmitting stations 20 to be targets of acceptable transmit power calculation to those secondary transmitting stations under management of limited spectrum managers. For example, a single spectrum manager 60 manages as many adjacent frequencies as multiple channels on both sides in some cases depending on a frequency. In this case, a plurality of calculation-target secondary transmitting stations can be managed by the same spectrum manager, and relevant information is aggregated at the same spectrum manager, whereby it is possible to achieve efficiency, such as a reduction in the number of accesses to the radio environment database 30 to obtain required information.

Next, a description will be given of a method for calculating acceptable transmit power, using interference reach frequencies when interference between adjacent frequencies are taken into consideration.

First, interference on an adjacent frequency exists, strictly saying, even on a frequency that is apart. Accordingly, a frequency range where interference of not smaller than an interference power threshold that is regarded as a sufficiently small value is estimated to reach out when a secondary transmitting station uses maximum transmit power, is defined as the reach of interference (interference reach frequencies) on a frequency axis. Assuming that the interference reach frequencies are represented by as many adjacent frequencies as k channels ($f_{i-k}$ to $f_{i+k}$ for a frequency $f_i$), then in the example shown in FIG. 15, interference on as many adjacent frequencies as one channel is considered, and hence k=1.

The acceptable transmit power $P(0,f_i)$ of a 0-th secondary transmitting station that has issued a request for start when it uses the frequency $f_i$ will be considered. If interference on an adjacent frequency is considered, interference $I(f_j,m)$ on an m-th primary receiving station using the frequency $f_j$ needs to be acceptable interference power $I_{max}(f_j,m)$ or smaller, as expressed by the following expression (4).

[Math. 4]

$$I(f_j, m) = \frac{P(0, f_i)}{L(0, f_i, m)}\alpha(f_j - f_i) + \sum_{i'=j-k}^{j+k}\sum_{n=1}^{N}\frac{P(n, f_{i'})}{L(n, f_{i'}, m)}\alpha(f_{i'} - f_j) \leq I_{max}(f_j, m) \quad (4)$$

Here, $\alpha(f_j-f_i)$ is a coefficient representing the degree of interference depending on the frequency difference $f_j-f_i$ and is determined depending on the above-mentioned adjacent channel leakage ratio and adjacent channel selectivity. When the frequency difference is 0, then $\alpha(0)=1$, and the larger the frequency difference $f_j-f_i$, the smaller $\alpha(f_j-f_i)$. When the frequency difference exceeds $f_j-f_{j+k}$, then $\alpha(f_j-f_i)$ becomes 0. Moreover, in the expression (4), it is assumed that $P(n,f_{i'})=0$ (i.e., interference from an n-th secondary transmitting station is not taken into consideration) when a frequency $f_{i'}$ is not an available frequency to the n-th secondary transmitting station (or its actually used frequency in a case where an actually used frequency is notified to a spectrum manager). To protect the primary system, the condition of the expression (4) needs to be satisfied for all primary receiving stations (1≤m≤M) that are using the interference reach frequencies $f_{i-k}$ to $f_{i+k}$ that are affected by the transmission at the frequency $f_i$ by the 0-th secondary transmitting station. That is, the expression (4) needs to be satisfied for $I(f_{i-k},m)$ to $I(f_{i+k},m)$, and consequently, secondary transmitting stations using $f_{i-2k}$ to $f_{i+2k}$ (secondary transmitting stations whose interference reach frequencies overlap) are affected and so included in targets of acceptable transmit power calculation. Acceptable transmit power can be determined by searching for a combination of $P(n,f_i)$ satisfying this condition.

Note that for the acceptable transmit power of the n-th secondary transmitting station (1≤n≤N) that has been already using the frequency, the smaller one of the acceptable transmit power obtained for the combination and the hitherto used acceptable transmit power is determined to be new acceptable transmit power. By selecting smaller acceptable transmit power, it is possible to protect from interference even those primary receiving stations that are affected by interference from the n-th secondary transmitting station selected as a calculation target but are not considered as a condition in the expression (3) (primary receiving stations using frequencies $f_{i-2k}$ to $f_{i-k-1}$ and $k_{i+k+1}$ to $f_{i+2k}$).

As described above, according to the sixth exemplary embodiment, spectrum managers manage secondary transmitting stations on a frequency basis, and when a secondary transmitting station issues a notice regarding a change in the state of frequency use, a spectrum manager corresponding to the relevant frequency calculates acceptable transmit power. Accordingly, since different spectrum managers manage different frequencies, it is possible to avoid concentration of notices regarding a change in the state of frequency use on a particular spectrum manager. That is, since occasions to calculate acceptable transmit power are not concentrated, it is possible to distribute occasions for calculation among a plurality of spectrum managers.

Moreover, when a spectrum manager receives a notice regarding a change in the state of frequency use by a secondary transmitting station, the spectrum manager calculates acceptable transmit power for other secondary transmitting stations using a frequency managed by another spectrum manager if necessary, in addition to secondary transmitting stations using a frequency of its management target as the center frequency. Accordingly, no redundant calculation processing occurs among different spectrum managers.

Furthermore, the use of interference reach frequencies makes it possible to eliminate unnecessary secondary transmitting stations from targets of acceptable transmit power calculation. Specifically, a secondary transmitting station whose interference reach frequencies do not overlap with a secondary transmitting station that makes a notice regarding a change in the state of frequency use is excluded from targets of acceptable transmit power calculation. Thus, it is possible to include only necessary secondary transmitting stations in targets of acceptable transmit power calculation.

Note that the sixth exemplary embodiment can be combined with the already described fifth exemplary embodiment. Specifically, it is possible to include only other secondary transmitting stations whose interference reach areas overlap with that of a secondary transmitting station that makes a notice regarding a change in the state of frequency use and also whose interference reach frequencies overlap with the secondary transmitting station that makes a notice regarding a change in the state of frequency use, in targets of acceptable transmit power calculation.

7. Seventh Exemplary Embodiment

In the above-described first to sixth exemplary embodiments, a spectrum manager calculates acceptable transmit power, triggered by receiving a notice regarding a change in the state of frequency use from a secondary transmitting station. On the other hand, a spectrum manager according to a seventh exemplary embodiment of the present invention calculates acceptable transmit power, triggered by receiving a radio environment measurement report from a sensor station. For the clarity of description, only different points from the first exemplary embodiment will be described.

A sensor station in the present exemplary embodiment is used for monitoring radio waves in a surrounding radio environment. The sensor station particularly measures interference from a secondary transmitting station on a primary receiving station. A spectrum manager can more accurately grasp the state of interference by having sensor stations deployed measure interference. Moreover, the sensor station measures not only interference from a secondary transmitting station but also a primary signal transmitted from a primary transmitting station, whereby the sensor station can be used to grasp the reception state in the primary system. Note that the sensor station may be a sensor set up dedicatedly to monitor radio waves, or it is also possible to utilize equivalent functionality of a different radio station (e.g., a base station, relay station, terminal, or the like in a cellular system that is the secondary system).

Figure 16:
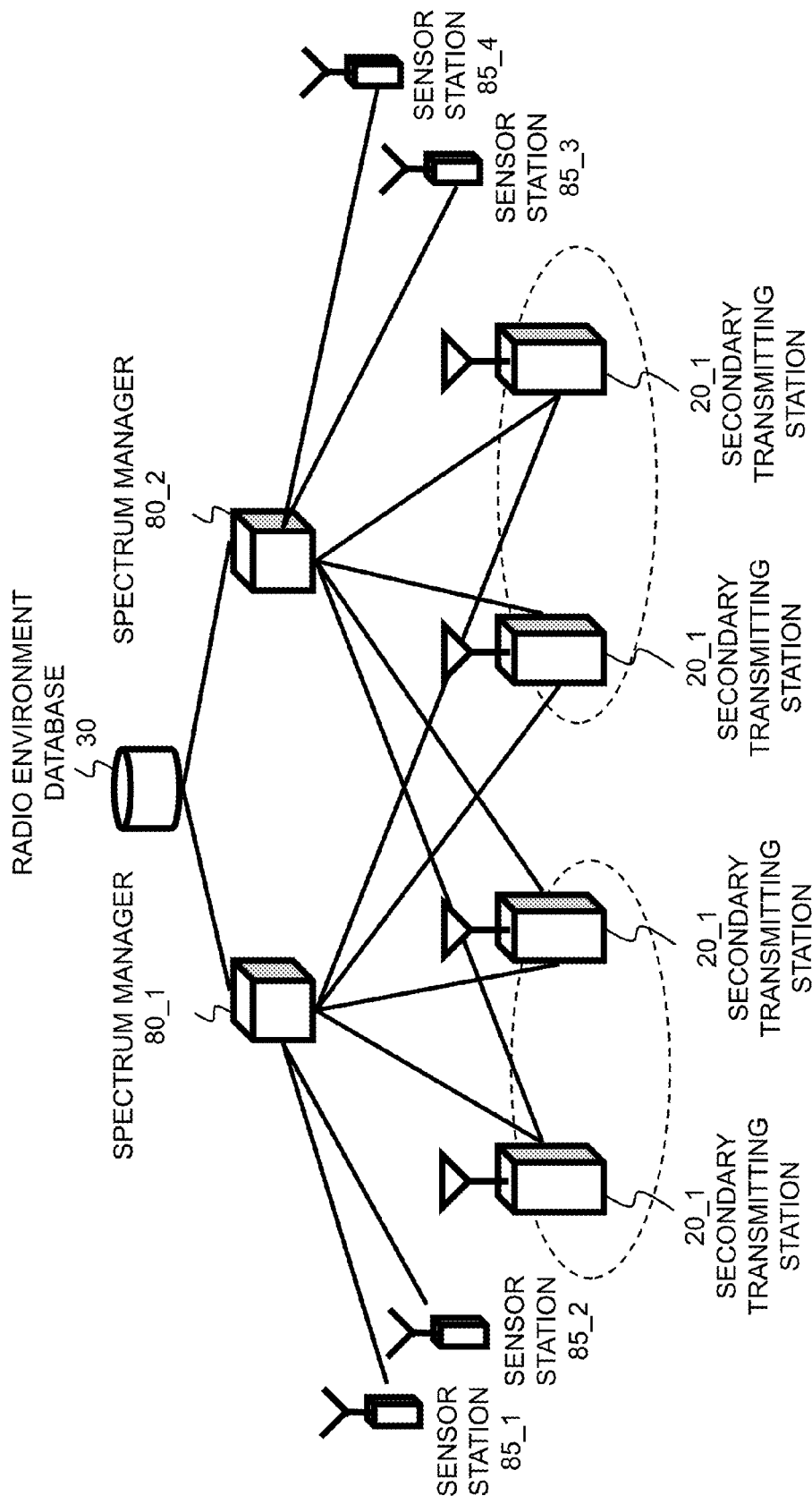
FIG. 16 is a system architecture diagram for describing a wireless system according to a seventh exemplary embodiment of the present invention.

Referring to FIG. 16, a wireless system according to the present exemplary embodiment is assumed to include sensor stations 85 (85_1, 85_2, 85_3, and 85_4), spectrum managers 80 (80_1 and 80_2), secondary transmitting stations 20 (20_1, 20_2, 20_3, and 20_4), and a radio environment database 30. Here, it is assumed that, as in the first exemplary embodiment shown in FIG. 2, the spectrum manager 80_1 manages the secondary transmitting stations 20_1 and 20_2, and the spectrum manager 80_2 manages the secondary transmitting stations 20_3 and 30_4. Further, it is assumed that the spectrum manager 80_1 manages the sensor stations 85_1 and 85_2, and the spectrum manager 80_2 manages the sensor stations 85_3 and 85_4. Here, a spectrum manager to manage a sensor station can be determined depending on the location of a sensor station, or uniquely to each sensor station (manufacture vendor or the like), or depending on a frequency measured by a sensor station.

Figure 17:
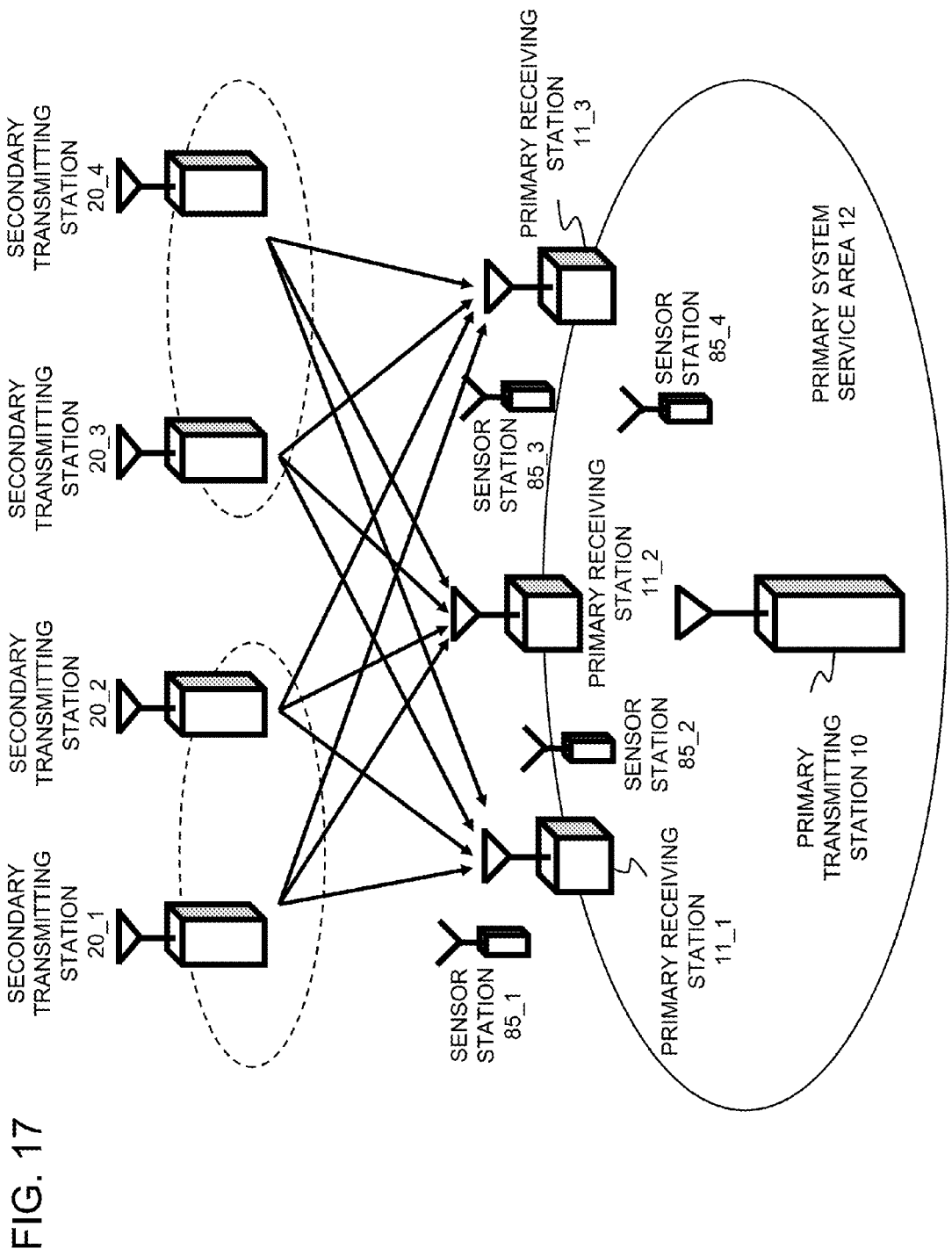
FIG. 17 is a diagram showing an architecture of a primary system in the wireless system according to the seventh exemplary embodiment.

FIG. 17 shows an example of deployment of the sensor stations 85 (85_1, 85_2, 85_3, and 85_4). Each sensor station is deployed in the vicinity of a primary receiving station 11_1, 11_2, or 11_3, but other sensor stations (nor shown) may exist. Moreover, it is assumed that the secondary transmitting stations 20 (20_1, 20_2, 20_3, and 20_4) are using the same frequency $f_i$.

The sensor stations each measure interference power from secondary transmitting stations at their respective locations. Conceivable measurement methods for a sensor station are the measurement of individual interference power of each secondary transmitting station and the measurement of aggregated interference power of multiple secondary stations. In the present exemplary embodiment, any one of them may be employed. Hereinafter, it is assumed that the sensor stations measure individual interference power of each secondary transmitting station, and for simplicity, a description will be given, focusing only on the sensor station 85_1. The sensor station 85_1 is set up in the vicinity of the primary receiving station 11_1 and performs interference measurement at the frequency $f_i$. This interference measurement may be performed cyclically, or may be performed in accordance with an instruction from the spectrum manager 80_1.

Figure 18:
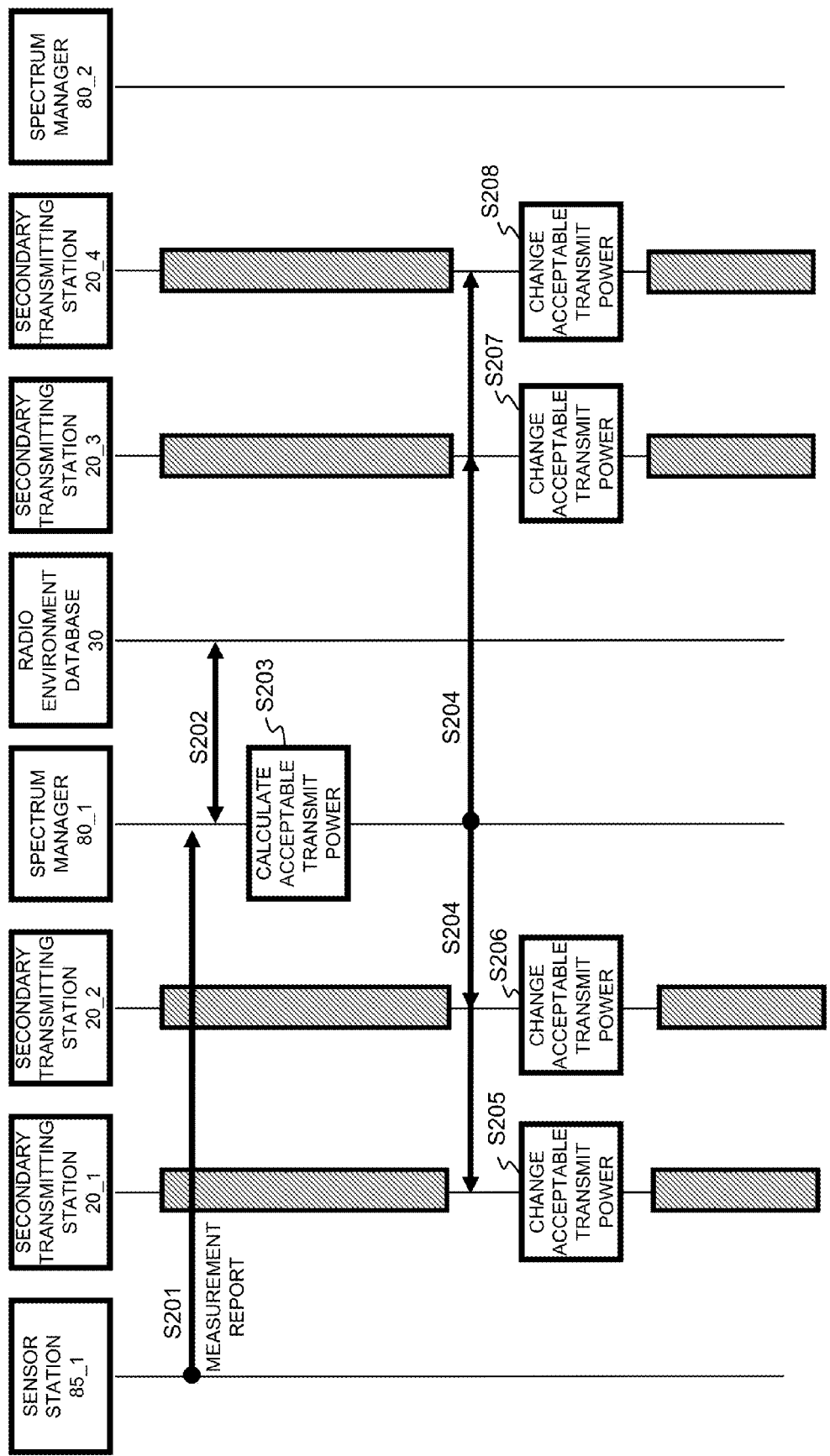
FIG. 18 is a sequence diagram showing operations when a measurement report is made in the wireless system according to the seventh exemplary embodiment.

Referring to FIG. 18, the sensor station 85_1, upon measuring interference, reports a measured value of interference power to the spectrum manger 80_1 that manages the sensor station 85_1 (Operation S201). This measured value of interference power is a measured value of individual interference indicating the interference power of each of the secondary transmitting stations (20_1, 20_2, 20_3, and 20_4), as described above.

Note that in a case where the secondary transmitting stations (20_1, 20_2, 20_3, and 20_4) notify their actually used frequencies and actual transmit power to the spectrum manger 80_1 (refer to the second exemplary embodiment), interference power in the vicinity of the primary receiving station 11_1 can be estimated by using the actual transmit power and path loss of each secondary transmitting station. In general, path loss estimated based on a propagation model has an error from actual path loss due to the effects of geographical, terrestrial and other features. Accordingly, interference power estimated based on a propagation model is compared with interference power in a measurement report, whereby path loss from each secondary transmitting station (20_1, 20_2, 20_3, and 20_4) to the vicinity of the primary receiving station 11_1 (or the vicinity of the sensor station 85_1) can be adjusted based on actual measurement.

The spectrum manager 80_1 obtains required information from the radio environment database 30 and registers information as described already (Operation S202), and thereafter adjusts path loss from each secondary transmitting station (20_1, 20_2, 20_3, and 20_4) to the primary receiving station 11_1 based on actual measurement and calculates acceptable transmit power by using new path loss (Operation S203). The spectrum manger 80_1 then notifies the calculated acceptable transmit power to each secondary transmitting station (20_1, 20_2, 20_3, and 20_4) (Operation S204). Thereafter, each secondary transmitting station changes its acceptable transmit power if necessary as described already (Operations S205 to S208) and continues communication using frequency sharing.

As described above, according to the seventh exemplary embodiment, a spectrum manager receives, as a notice regarding a change in the state of frequency use, a radio environment measurement report from a sensor station under its own management, and calculates acceptable transmit power for secondary transmitting stations under its own management and secondary transmitting stations under management of another spectrum manager and notifies them.

First, since different spectrum managers manage different sensor stations, it is possible to avoid concentration of radio environment measurement reports on a particular spectrum manager. That is, since occasions to calculate acceptable transmit power are not concentrated, it is possible to distribute occasions for calculation among a plurality of spectrum managers.

Moreover, when a spectrum manager receives a radio environment measurement report from a sensor station under its own management, this spectrum manager calculates acceptable transmit power also for other secondary transmitting stations managed by another spectrum manager and notifies them, in addition to secondary transmitting stations under its own management. Accordingly, no redundant calculation processing occurs among different spectrum managers.

Hence, when the acceptable transmit power of secondary transmitting stations is calculated, it is possible to preclude redundant calculation processing while avoiding concentration of processing load.

8. Other Embodiments

According to the above-described first to seventh exemplary embodiments, when the acceptable transmit power of secondary transmitting stations is calculated, it is possible to preclude redundant calculation processing among spectrum managers while avoiding concentration of processing load.

Moreover, each of the primary and secondary systems may be different RAT (Radio Access Technology) or may be the same RAT. An example of different RAT is a combination of a TV broadcast system and a cellular system as described above. An example of the same RAT is a case where the primary system is a macro cell and the secondary system is a femto cell set up within the macro cell.

Furthermore, in the above-described first to seventh exemplary embodiments, each of the spectrum manger and the radio environment database may be a system that is different from the secondary system and provides frequency management for multiple secondary systems, or may be part of a secondary system.

It is also possible to implement the spectrum manager in the above-described first to seventh exemplary embodiments as predetermined hardware, for example, a circuit. Moreover, the spectrum manger may also be configured to operate by being controlled by a computer circuit (not shown; e.g., CPU (Central Processing Unit)) in accordance with control programs. In this case, these control programs are stored on, for example, a storage medium (e.g., ROM (Read Only Memory), hard disk or the like) within a device or system, or on an external storage medium (e.g., removable medium, removable disk or the like) and read and executed by the above-mentioned computer circuit.

Note that the present invention is not limited to the above-described embodiments, and various modifications and applications can be made without departing from the gist of the invention.

INDUSTRIAL APPLICABILITY

The present invention is applicable to the management of frequency use when frequencies allocated to a TV broadcast system are used by a cellular system.

REFERENCE SIGNS LIST

10 Primary transmitting station
11, 11_1 to 11_3 Primary receiving station
12 Primary system service area
20, 20_0 to 20_8 Secondary transmitting station
IA20_0 to IA20_4 Interference reach area
30 Radio environment database
40, 40_1, 40_2, 50, 50_1, 50_2, 51, 51_1, 51_2, 52, 52_1, 52_2, 60_1 to 60_4, 80, 80_1, 80_2 Spectrum manager
A50_1 to A50_4 Management area of spectrum manager
85, 85_1 to 85_4 Sensor station
501, 511, 521 Network communication section
502, 512, 522 Frequency use reception section
503, 513 Database information storage section
523 Radio environment database
504, 514, 524 Acceptable transmit power setting section

The invention claimed is:

1. A frequency management apparatus for managing frequency use by radio stations in a wireless system that shares a frequency allocated to another wireless system, comprising:
a frequency use reception section for receiving a notice regarding a change in state of frequency use from a radio station managed by this frequency management apparatus; and
an acceptable transmit power setting section for setting acceptable transmit power for at least one radio station managed by another frequency management apparatus different from the frequency management apparatus, based on the notified change in state of frequency use.

2. The frequency management apparatus according to claim 1, wherein the acceptable transmit power setting section further sets acceptable transmit power for a radio station managed by the frequency management apparatus, based on the notified change in state of frequency use.

3. The frequency management apparatus according to claim 1, wherein the acceptable transmit power setting section sets acceptable transmit power for each of the radio station that has sent the notice and a radio station that is using the frequency.

4. The frequency management apparatus according to claim 1, wherein the acceptable transmit power is set such that interference on the other wireless system does not exceed a predetermined threshold.

5. The frequency management apparatus according to claim 1, wherein the acceptable transmit power setting section limits radio stations to be targets of setting of acceptable transmit power, based on reaches of interference from each radio station managed by the frequency management apparatus and from each radio station managed by the another frequency management apparatus.

6. The frequency management apparatus according to claim 5, wherein the reach of interference is a spatial area where interference reaches out and/or a frequency range where interference reaches out in frequency direction.

7. The frequency management apparatus according to claim 1, wherein an area in which a radio station managed by the frequency management apparatus is placed is different from an area in which a radio station managed by the another frequency management apparatus is placed.

8. The frequency management apparatus according to claim 1, wherein the frequency managed by the frequency management apparatus is different from a frequency managed by the another frequency management apparatus.

9. The frequency management apparatus according to claim 1, wherein the frequency use reception section determines which radio station the notice regarding a change in state of frequency use is received from, based on location of a radio station, a frequency that is a target of calculation of acceptable transmit power, or a predetermined criterion.

10. The frequency management apparatus according to claim 1, wherein the acceptable transmit power setting section sets the acceptable transmit power by using a measured value of interference that a radio station managed by the frequency management apparatus and each radio station managed by the another frequency management apparatus cause on the other wireless system.

11. The frequency management apparatus according to claim 10, wherein the notice regarding a change in state of frequency use is a report on measurement of the interference from a sensor station managed by the frequency management apparatus.

12. The frequency management apparatus according to claim 1, wherein the notice regarding a change in state of frequency use is any of a request for start of frequency use, a notice of stop of frequency use, a request to change transmit power, and a request to change frequencies from a radio station managed by the frequency management apparatus.

13. The frequency management apparatus according to claim 1, wherein the acceptable transmit power setting section notifies the acceptable transmit power to a radio station managed by the another frequency management apparatus directly or via the another frequency management apparatus.

14. A frequency management method for managing frequency use by radio stations in a wireless system that shares a frequency allocated to another wireless system, comprising:
 by a frequency use reception section, receiving a notice regarding a change in state of frequency use from a radio station managed by a relevant frequency management apparatus; and
 by an acceptable transmit power setting section, setting acceptable transmit power for at least one radio station managed by another frequency management apparatus different from the frequency management apparatus, based on the notified change in state of frequency use.

15. The frequency management method according to claim 14, wherein the acceptable transmit power setting section further sets acceptable transmit power for a radio station managed by the frequency management apparatus, based on the notified change in state of frequency use.

16. The frequency management method according to claim 14, wherein the acceptable transmit power setting section sets acceptable transmit power for each of the radio station that has sent the notice and a radio station that is using the frequency.

17. The frequency management method according to claim 14, wherein the acceptable transmit power is set such that interference on the other wireless system does not exceed a predetermined threshold.

18. The frequency management method according to claim 14, wherein the acceptable transmit power setting section limits radio stations to be targets of setting of acceptable transmit power, based on reaches of interference from each radio station managed by the frequency management apparatus and from each radio station managed by the another frequency management apparatus.

19. The frequency management method according to claim 18, wherein the reach of interference is a spatial area where interference reaches out and/or a frequency range where interference reaches out in frequency directions.

20. The frequency management method according to claim 14, wherein a frequency managed by the frequency management apparatus is different from a frequency managed by the another frequency management apparatus.

21. The frequency management method according to claim 14, wherein the frequency use reception section determines which radio station the notice regarding a change in state of frequency use is received from, based on location of a radio station, a frequency that is a target of calculation of acceptable transmit power, or a predetermined criterion.

22. The frequency management method according to claim 14, wherein the acceptable transmit power setting section sets the acceptable transmit power by using a measured value of interference that a radio station managed by the frequency management apparatus and each radio station managed by the another frequency management apparatus causes on the other wireless system.

23. The frequency management method according to claim 22, wherein the notice regarding a change in state of frequency use is a report on measurement of the interference from a sensor station managed by the frequency management apparatus.

24. The frequency management method according to claim 14, wherein the notice regarding a change in state of frequency use is any of a request for start of frequency use, a notice of stop of frequency use, a request to change transmit power, and a request to change frequencies from a radio station managed by the frequency management apparatus.

25. The frequency management method according to claim 14, wherein the acceptable transmit power setting section notifies the acceptable transmit power to a radio station managed by the another frequency management apparatus directly or via the another frequency management apparatus.

26. A wireless system that shares a frequency allocated to another wireless system, comprising:
 a plurality of radio stations that share the frequency; and
 a plurality of frequency management apparatuses that manage frequency use by the plurality of radio stations,
 wherein a first frequency management apparatus, when receiving a notice regarding a change in state of frequency use from a radio station under its own management, sets acceptable transmit power for at least one radio station managed by a second frequency management apparatus different from the first frequency management apparatus, based on the notified change in state of frequency use.

27. The wireless system according to claim 26, wherein the first frequency management apparatus further sets acceptable transmit power for a radio station managed by the first frequency management apparatus, based on the notified change in state of frequency use.

28. A radio station in a wireless system that shares a frequency allocated to another wireless system, comprising:
 a section for sending a notice regarding a change in state of frequency use to a first frequency management apparatus that manages this radio station; and
 a section for setting acceptable transmit power based on a set value of acceptable transmit power received directly from a second frequency management apparatus different from the first frequency management apparatus, or from the second frequency management apparatus via the first frequency management apparatus.

* * * * *